(12) United States Patent
Gibbs et al.

(10) Patent No.: US 9,957,186 B2
(45) Date of Patent: May 1, 2018

(54) ELECTRIC GLORY HOLE VIDEO CAMERA ASSEMBLY

(71) Applicant: THE CORNING MUSEUM OF GLASS, Corning, NY (US)

(72) Inventors: Steven Thomas Gibbs, Elmira Heights, NY (US); Fred Charles Metz, Seattle, WA (US)

(73) Assignees: Corning Museum of Glass, Corning, NY (US); Spiral Arts Inc., Seattle, WA (US)

( * ) Notice: Subject to any disclaimer, the term of this patent is extended or adjusted under 35 U.S.C. 154(b) by 746 days.

(21) Appl. No.: 14/509,513

(22) Filed: Oct. 8, 2014

(65) Prior Publication Data

US 2015/0024858 A1 Jan. 22, 2015

Related U.S. Application Data

(63) Continuation of application No. 12/603,167, filed on Oct. 21, 2009, now Pat. No. 8,891,582.

(51) Int. Cl.

| | |
|---|---|
| *C03B 5/027* | (2006.01) |
| *C03B 5/02* | (2006.01) |
| *C03B 29/02* | (2006.01) |
| *C03B 5/033* | (2006.01) |
| *C03B 5/43* | (2006.01) |

(Continued)

(52) U.S. Cl.
CPC .............. *C03B 29/02* (2013.01); *C03B 5/02* (2013.01); *C03B 5/025* (2013.01); *C03B 5/0334* (2013.01); *C03B 5/08* (2013.01); *C03B 5/42* (2013.01); *C03B 5/43* (2013.01); *C03B 7/01* (2013.01); *F27B 14/06* (2013.01); *F27B 14/08* (2013.01); *F27B 19/04* (2013.01); *H05B 3/141* (2013.01)

(58) Field of Classification Search
CPC .......... C03B 5/02; C03B 5/0334; C03B 5/08; C03B 5/43; C03B 5/025; C03B 5/42; C03B 7/01; C03B 29/02; F27B 14/08; F27B 14/06; F27B 19/04; H05B 3/141
USPC ........... 373/27, 30, 34, 36, 39, 40, 109–137; 65/30.14, 41, 46, 64, 69, 114, 117, 127, 65/161, 208, 230, 262, 269, 271, 274, 65/275; 219/420, 427, 530, 607, 643; 473/30; 432/65, 250
See application file for complete search history.

(56) References Cited

U.S. PATENT DOCUMENTS

| | | |
|---|---|---|
| 1,735,775 A | 11/1929 | McSwain |
| 2,074,974 A | 3/1937 | Stewart .......................... 49/57 |

(Continued)

FOREIGN PATENT DOCUMENTS

| | | |
|---|---|---|
| JP | 1987286234 | 12/1987 |
| WO | 03/025488 | 3/2003 |

OTHER PUBLICATIONS

Murnane, R.A., et al., "Evolution of Simulation Techniques to Model Electric Glass Furnaces," IEEE Eplore, Mar. 4, 2009, pp. 1384-1394.

(Continued)

*Primary Examiner* — Hung D Nguyen
(74) *Attorney, Agent, or Firm* — Susan S. Wilks

(57) ABSTRACT

An electric glass hot shop system is described herein that has at least one electrically powered heating unit (e.g., electric furnace, electric glory hole, electric pipe warmer, electric color box, electric annealer, electric crucible kiln) used in the processing of glass.

13 Claims, 24 Drawing Sheets

(51) Int. Cl.
  *C03B 7/01* (2006.01)
  *F27B 14/08* (2006.01)
  *F27B 19/04* (2006.01)
  *H05B 3/14* (2006.01)
  *C03B 5/08* (2006.01)
  *C03B 5/42* (2006.01)
  *F27B 14/06* (2006.01)

(56) References Cited

U.S. PATENT DOCUMENTS

| | | | |
|---|---|---|---|
| 2,223,507 A | 12/1940 | Blakeslee, Jr. et al. | |
| 2,226,701 A | 12/1940 | Benner et al. | 49/54 |
| 2,916,535 A | 12/1959 | Marden et al. | |
| 2,955,384 A | 10/1960 | Silverman | |
| 3,196,252 A | 7/1965 | Weingrad | |
| 3,436,861 A | 4/1969 | Koch | 49/246 |
| 4,106,820 A | 8/1978 | Ruhnau et al. | |
| 4,417,346 A | 11/1983 | Giler | 373/137 |
| 4,468,779 A | 8/1984 | Gillman | |
| 4,803,698 A | 2/1989 | Stephens | |
| 4,981,088 A | 1/1991 | Burris | |
| 5,158,043 A * | 10/1992 | Emsbo | F23M 7/00 110/173 R |
| 5,835,525 A | 11/1998 | Thomas | 373/137 |
| 5,908,482 A | 6/1999 | Komine et al. | |
| 5,976,445 A | 11/1999 | Kuroda et al. | 264/297.4 |
| 6,244,099 B1 | 6/2001 | Ball et al. | 73/46 |
| 6,279,494 B1 | 8/2001 | Jimbo et al. | 110/346 |
| 6,325,621 B1 | 12/2001 | Murasaki et al. | 432/250 |
| 6,355,904 B1 * | 3/2002 | Batdorf | B09B 3/00 110/346 |
| 6,769,424 B2 | 8/2004 | Perrault | |
| 7,003,014 B2 | 2/2006 | Uemori et al. | 373/117 |
| 2006/0193366 A1 * | 8/2006 | Emami | H01C 3/20 373/119 |
| 2008/0276925 A1 * | 11/2008 | Griswold | F24C 15/022 126/19 R |
| 2011/0090933 A1 | 4/2011 | Gibbs et al. | |

OTHER PUBLICATIONS

Sinotte, S.R., "The Silicon Carbide Electric Furnace: State of the Art," The Glass Art Society 1990 Journal, pp. 89-95.

Electroglass® Electric Glory Hole, http://www.electroglass.com/gloryholespec.html, Apr. 27, 2009, p. 1 of 1.

Electroglass® Series 6000 Furnace Specifications—2003, http://www.electroglass.com/specifications.html, Mar. 4, 2009, pp. 1-3 and 1-4.

Sinotte, S.R., "Why We Don't Make a Moly Furnace—It's Overly Complicated," http://www.electroglass.com/specifications.html, Mar. 4, 2009, pp. 1-4.

"Silicon Carbide," http://www.electroglass.com/SiliconCarbideStarbars.htm, Mar. 4, 2009, pp. 1-3.

"Stadelman Glass Equipment," http://www.stadelmanglass.com/equipment.html, Mar. 4, 2009, pp. 1-2 and 1 of 1.

\* cited by examiner

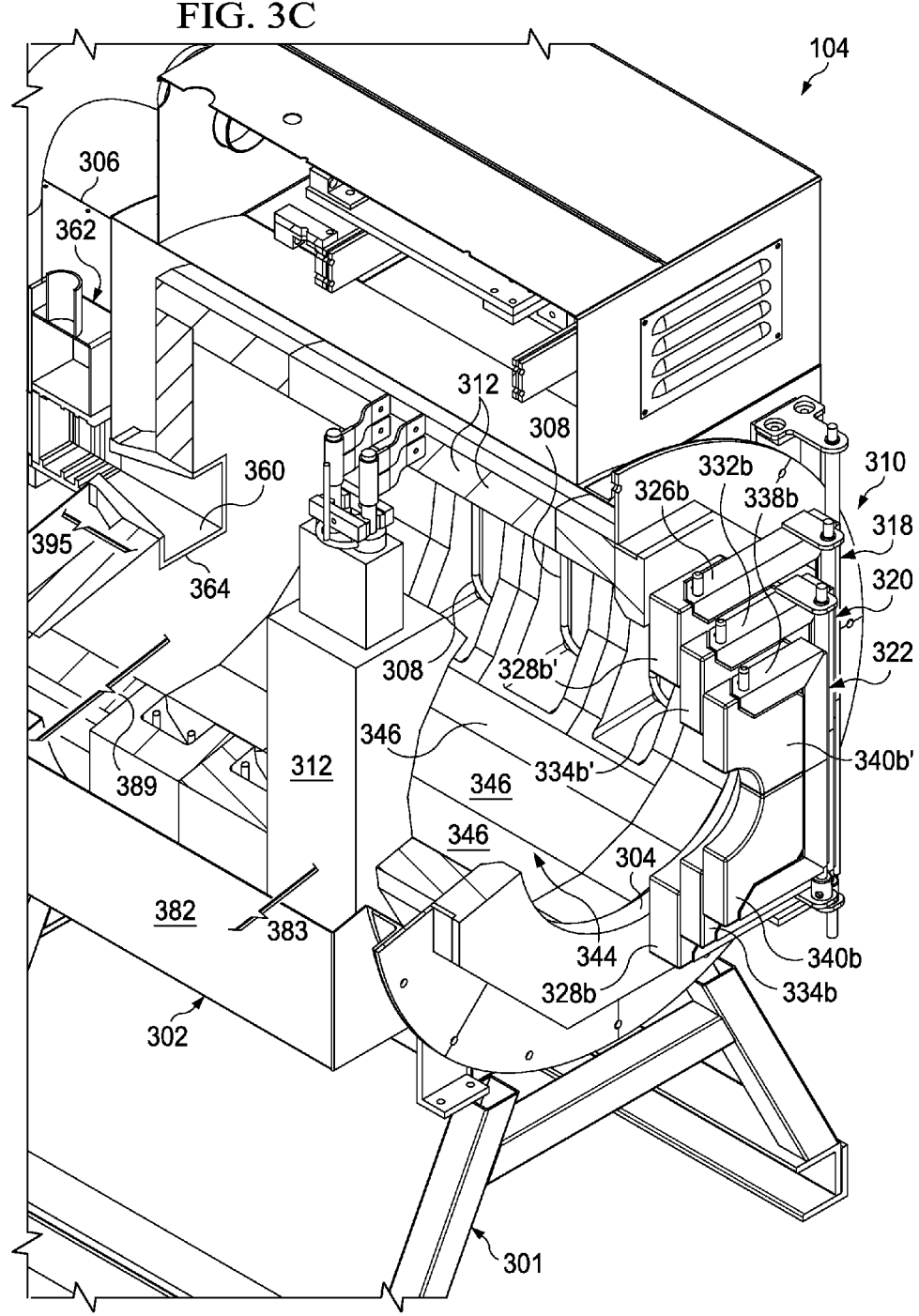

ELECTRIC GLORY HOLE VIDEO CAMERA ASSEMBLY

CLAIMING BENEFIT OF PRIOR FILED U.S. APPLICATION

This is a continuation of U.S. patent application Ser. No. 12/603,167 entitled "Electric Glass Hot Shop System" filed on Oct. 21, 2009, the content of which is relied upon and incorporated herein by reference in its entirety.

TECHNICAL FIELD

The present invention relates to an electric glass hot shop system that has at least one electrically powered heating unit (e.g., electric furnace, electric glory hole, electric pipe warmer, electric color box, electric annealer, electric crucible kiln) used in the processing of glass.

BACKGROUND

Extremely high temperatures are required to enable the melting, processing and forming of glass. In typical glass forming operations this high temperature requirement extends to the initial melting of the glass in a furnace, the periodic re-heating of the glass in a glory hole, the heating of the glass while applying colored additives in a color box, the pre-heating of a glass manipulating pipe in a pipe warmer, and the annealing of formed glass in an annealer. Generally, glass working equipment uses natural gas or propane fueled flames as heat sources to melt, process and form the glass. However, there are some situations or venues where a gas source is not readily available, or where the use of a gas source is excluded for safety reasons. For instance, one such situation or venue where a gas source is prohibited for safety reasons is on a cruise ship where it would be desirable to be able to perform hot glass forming shows for people vacationing on the cruise ship.

In these situations or venues, electrically heated glass working equipment are alternatives to the glass working equipment that use a gas source. The electrically heated glass working equipment utilize electrically resistive heating elements such as, for example, molybdenum disilicide to generate radiative heat. Unfortunately, electricity is typically a poor means of supplying bulk energy to glass working equipment. For instance, a typical glass furnace of about 150 lbs capacity would have to be supplied with a 400,000 BTU burner, which is the equivalent of approximately 115 KW of electrical power. However, 115 KW power supplies are generally much too expensive and bulky to be considered as a useful source of energy for such a small glass furnace. In contrast, power supplies of <35 KW are economically feasible and can be a useful source of energy for a glass furnace if a more efficient insulation package is provided and the glass is allowed a longer period of time to melt and fine out. There are several types of electrically heated glass furnaces currently available today on the market, which use low energy inputs, but they have their own problems and they often introduce design features that limit their usefulness. These problems and other problems associated with other types of glass working equipment are discussed below.

Furnace
  Existing door systems have tracks and wheels which fail to create a tight seal and are prone to energy leakage. Furthermore, existing rear hinge designs eliminate easy access to heating elements in the top of the furnace The heating elements are mounted in the top (crown) of the furnace, which means that the heating elements and corresponding electrical supplies must be removed to be able to access and service the crucible.

Glory Hole (GH)
  Existing door systems are difficult to maintain and have undesirable energy leakage.
  There are few electric glory hole's commercially available. Perhaps one reason for this is that heating elements are located in a position that creates a potential for contact with glass which if this occurred it would render the heating elements useless.

Another possible reason is that electric heat elements provide mostly radiant heat with very little convection energy like gas fired glory holes and as a result there would be undesirable hot spots in the walls next to the heating element holders.

Combination Pipe Warmer and Color Box
  There are no electrically heated pipe warmers commercially available.

Annealer
  Existing annealer door seals fail due to their exposure to heat and abrasion during the loading and unloading of the annealer.

Annealer's Crucible Kiln
  Existing door is too large and when it is opened to much heat escapes.

Thus, any enhancement of the traditional glass working equipment and in particular the electrical glass working equipment would help improve the melting, processing and forming of glass.

SUMMARY

In one aspect, the present invention provides an electric glass hot shop system for processing glass that includes: (a) an electric furnace; (b) an electric glory hole; (c) an electric pipe warmer; (d) an electric color box; (e) an electric annealer; and (f) an electric crucible kiln. The electric glass hot shop system is well suited to be used in a venue or situation where a gas source is prohibited to be used for safety reasons like on a cruise ship.

In another aspect, the present invention provides an electric glory hole for processing glass. In one example, the electric glory hole includes: (a) a body with a first opening located therein; and (b) a door system including a first door which is hung over the first opening in the body, where the first door has a first hinged side and a second hinged side, where the first hinged side has a first frame that receives and supports at least one cast block, and where the second hinged side has a second frame that receives and supports at least one cast block. The door system may further include: (a) a second door which has a first hinged side and a second hinged side, where the first hinged side has a first frame that receives and supports at least one cast block, and where the second hinged side has a second frame that receives and supports at least one cast block; (b) a third door which has a first hinged side and a second hinged side, where the first hinged side has a first frame that receives and supports at least one cast block, and where the second hinged side has a second frame that receives and supports at least one cast block; and (c) the first door is hung over the first opening on the body, and the second door is hung on the first door, and the third door is hung on the second door. The electric glory hole may also include a specially designed refractory element baffle which is located within the body, where each refractory element baffle includes a block with a passage through which an heating element is inserted and a cavity in which hangs the heating element, where the cavity is larger than the heating element, and where the cavity is sized to encompass at least three sides of the heating element. Furthermore, the electric glory hole may have one or more specially designed insulation packages which help to maintain a desired temperature within the body.

In yet another aspect, the present invention provides an electric furnace for processing glass. In one example, the electric furnace includes: (a) a crucible unit; and (b) a heating unit, coupled to the crucible unit, where the heating unit has an opening formed therein and a door attached to a cantilevered arm which has a hinge connected to at least an outer portion of the heating unit, where the cantilevered arm rotates on the hinge such that the door is moved to cover the opening and prevent access to an interior of the heating unit and the crucible or the door is moved away from the opening to allow access to the interior of the heating unit and the crucible. The heating unit may further include a crown suspension system located therein which supports at least one heating element, where the crown suspension system includes a ring of locking bricks that support a crown casting which then supports the at least one heating element. Furthermore, the electric furnace may have one or more specially designed insulation packages which help to maintain a desired temperature within the crucible and the heating unit.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIGS. 3A-3M are different diagrams illustrating in greater detail the exemplary electric glory hole shown in FIG. 1 in accordance with an embodiment of the present invention;

DETAILED DESCRIPTION

Figure 1:
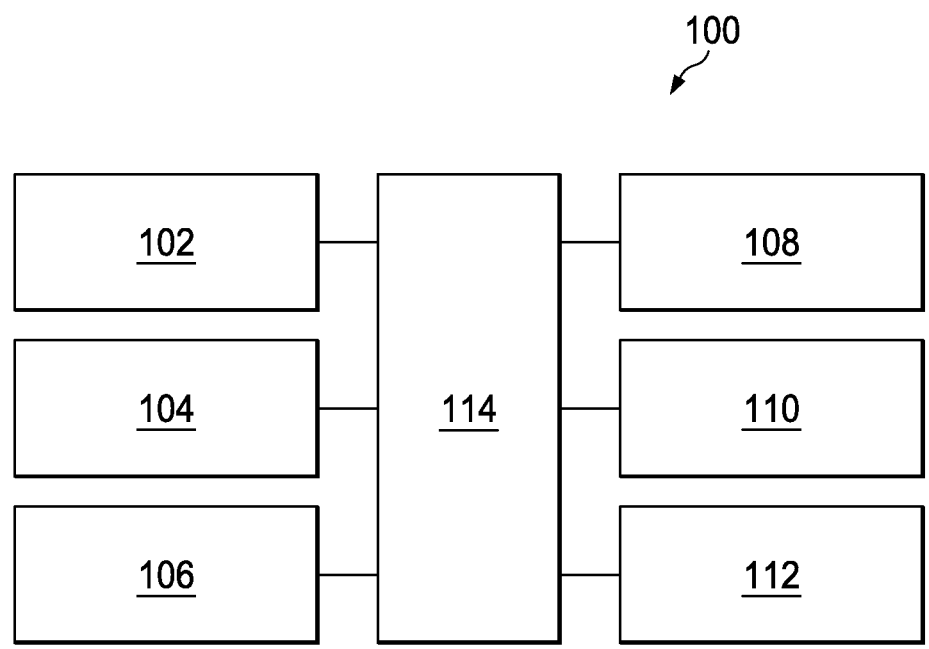
FIG. 1 is a block diagram of an exemplary electric glass hot shop system which includes an electric furnace, an electric glory hole, an electric pipe warmer, an electric color box, an electric annealer, and an electric crucible kiln in accordance with an embodiment of the present invention.

Referring to FIG. 1, there is shown a block diagram of an exemplary electric glass hot shop system 100 in accordance with an embodiment of the present invention. In this example, the electric glass hot shop system 100 includes an electric furnace 102, an electric glory hole 104, an electric pipe warmer 106, an electric color box 108, an electric annealer 110, and an electric crucible kiln 112. The electric glass hot shop system 100 further includes a power supply 114 (e.g., ≤35 KW power supply 114) that supplies electricity to the electric furnace 102, the electric glory hole 104, the electric pipe warmer 106, the electric color box 108, the electric annealer 110, and the electric crucible kiln 112. Typically, the electric furnace 102 is used to melt batch materials to form a molten glass. The electric glory hole 104 is used to periodically re-heat the molten glass while a pipe is used to hold and manipulate the molten glass to form the desired glass shape. The electric pipe warmer 106 is used to pre-heat the pipe. The electric color box 108 is used to apply colored additives to the molten glass during the forming process. The electric annealer 110 is used to anneal the formed glass. The electric crucible kiln 112 which is placed under the electric annealer 110 is used to melt small quantities of glass and colored fits, usually less then 50 lbs. Each piece of electric glass working equipment 102, 104, 106, 108, 110 and 112 is considered to be an individual component that can stand and function alone rather than having to be part of the entire electric glass hot shop system 100. Each electric glass working equipment 102, 104, 106, 108, 110 and 112 is discussed and described in greater detail below with respect to FIGS. 2-6.

Referring to FIGS. 2A-2G, there are different diagrams illustrating in greater detail the exemplary electric furnace 102 in accordance with an embodiment of the present invention. The electric furnace 102 includes a crucible unit 202, a heating unit 204, and an electrical control box 206 (see FIGS. 2A-2B). The crucible unit 202 is where the batch materials are placed and then melted to form the molten glass (not shown). The crucible unit 202 is attached to the heating unit 204 in a manner that makes it easy to drop and move the crucible unit 202 out of the way when one needs to perform maintenance on the heating unit 204. Also, the crucible unit 202 can be easily dropped and removed from the heating unit 204 so a new crucible unit 202 can be quickly connected to the heating unit 204. The electrical control box 206 supplies the required electricity to one or more heating elements 208 which are located within the heating unit 204. The electric furnace 102 includes other components but only the components like a crown suspension system 210, a torsion-box door system 212, and specially designed insulation packages 214a, 214b and 214c which are relevant to the present discussion are described in detail below.

Figure 2A:
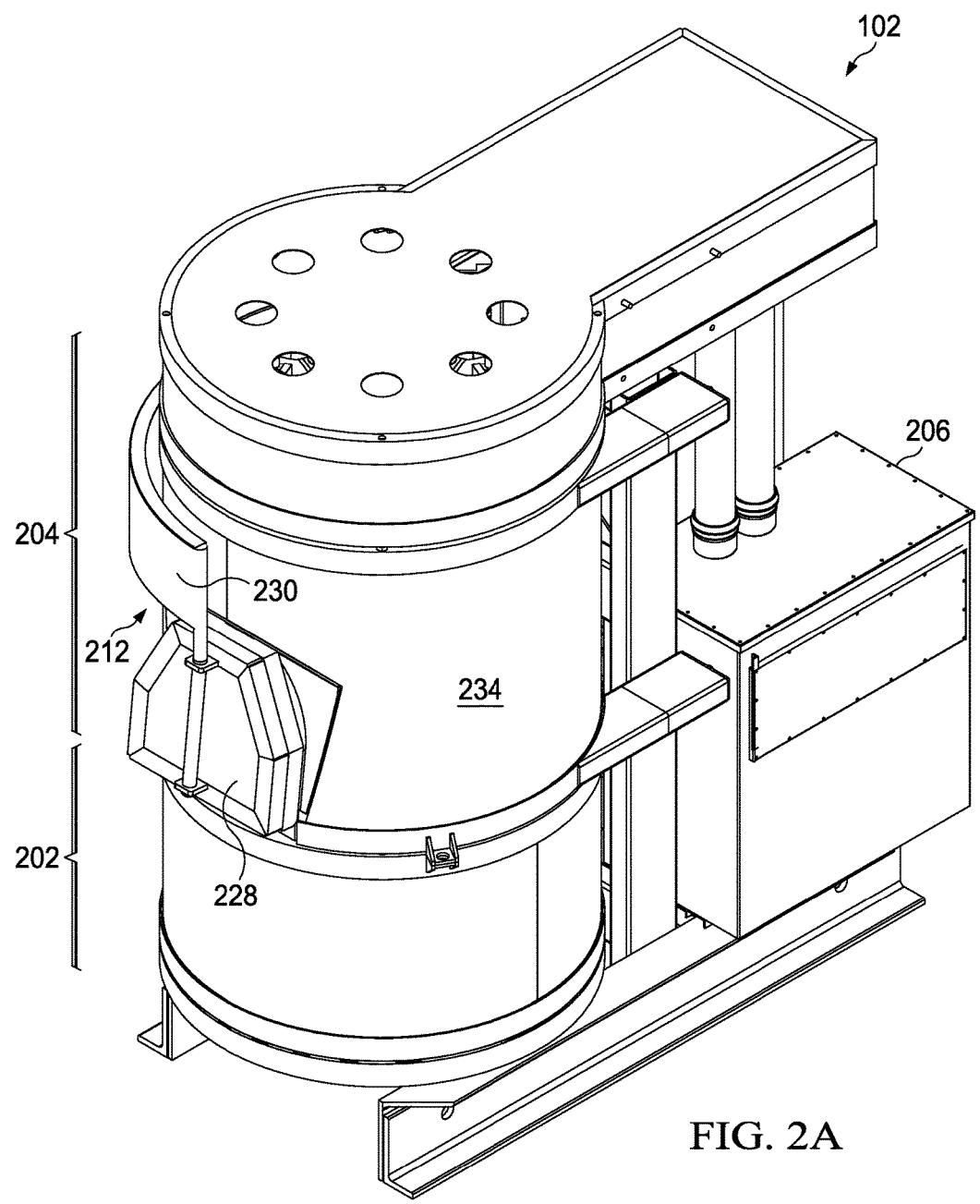
FIGS. 2A-2G are different diagrams illustrating in greater detail the exemplary electric furnace shown in FIG. 1 in accordance with an embodiment of the present invention.
Figure 2B:
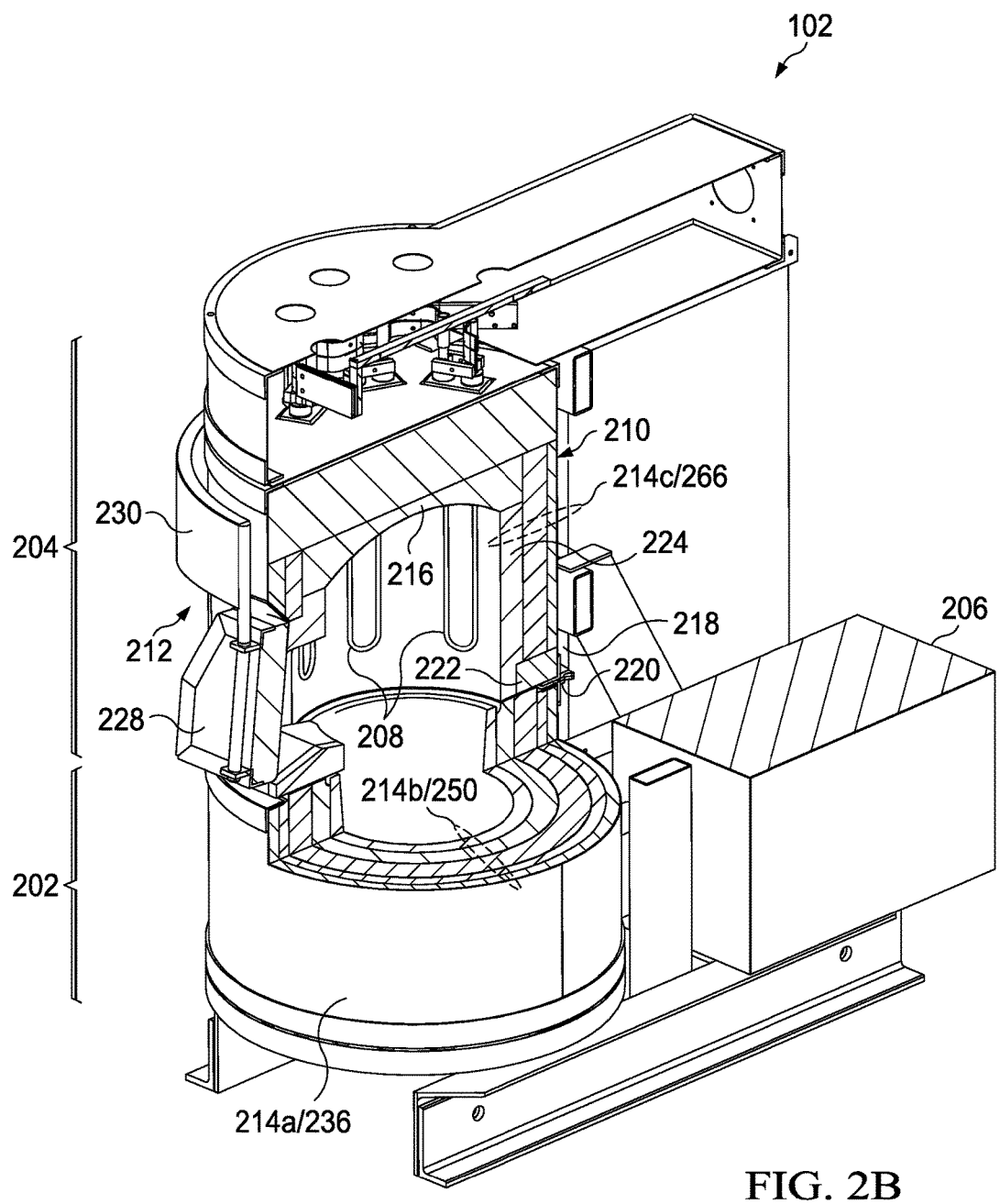
Figure 2C:
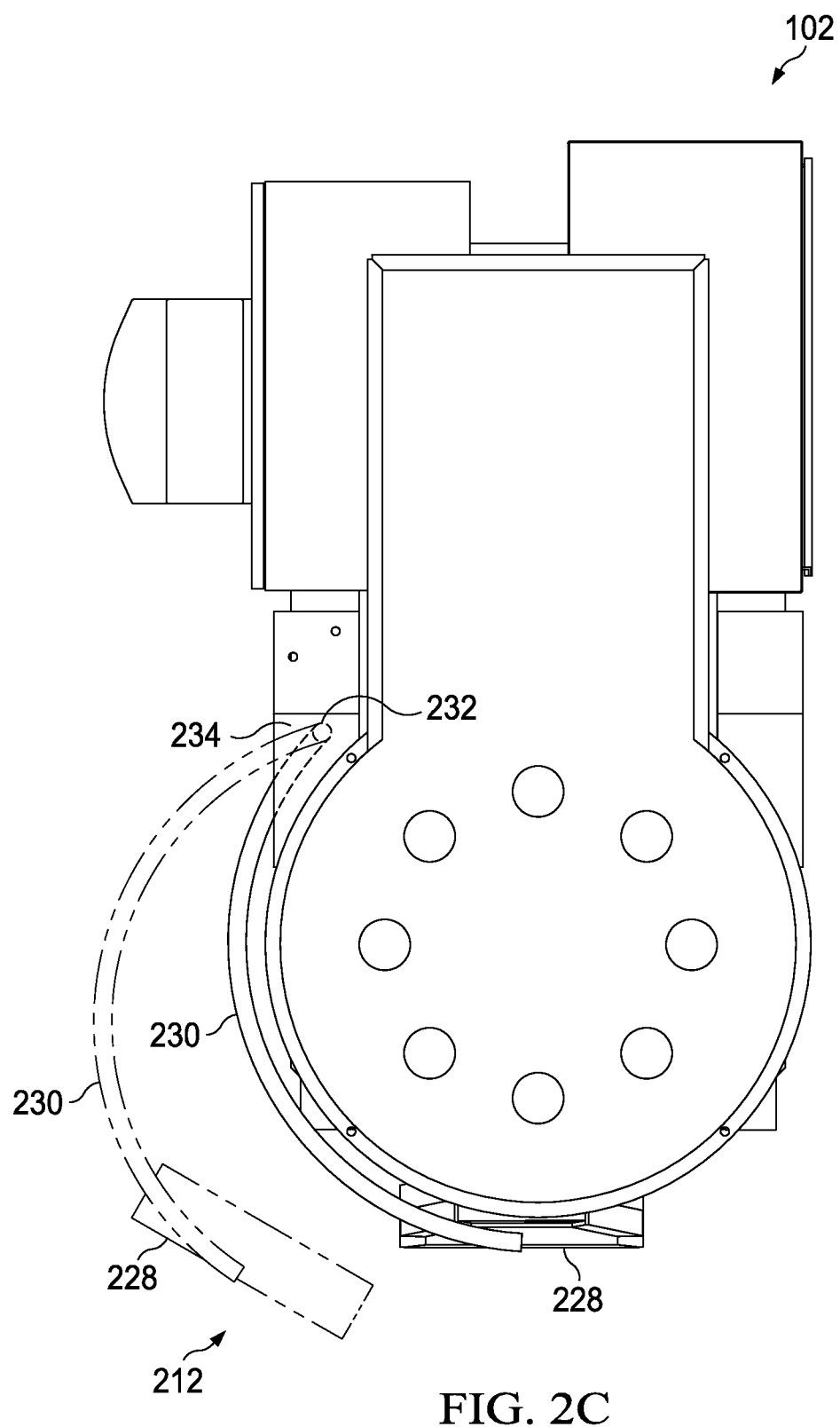
Figure 2D:
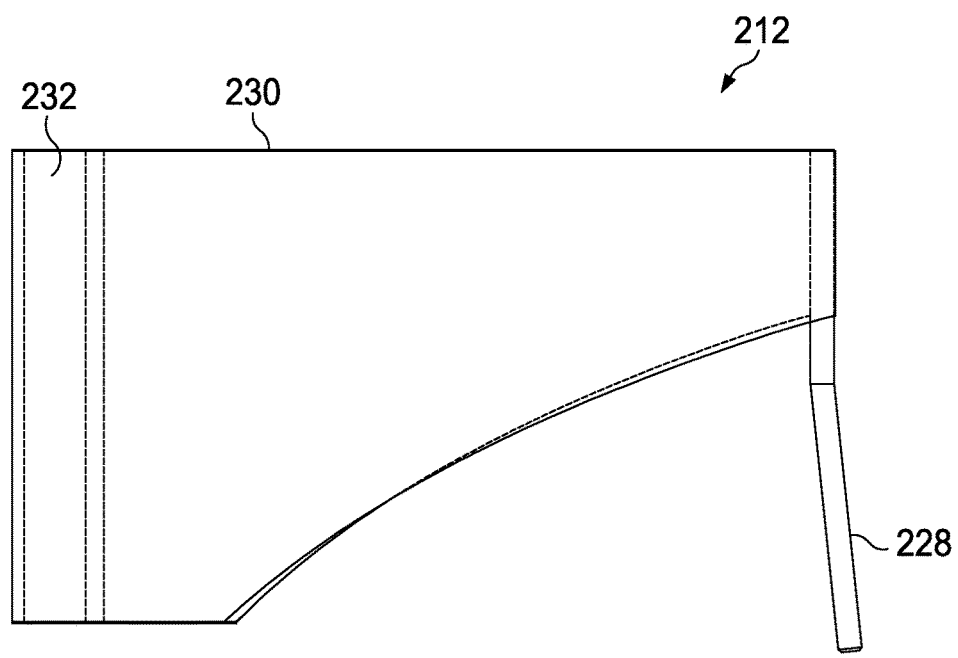

As shown in FIG. 2B, the heating unit 204 incorporates the crown suspension system 210 which has a crown 216 that supports the heating elements 208 in a manner that allows the crucible unit 202 to be serviced without having to remove the crucible unit 202 from the heating unit 204. The crown suspension system 210 includes a cast tube 218 (outer body of furnace 102) which has a rabbit 220 on the bottom edge thereof is configured to receive a ring of locking bricks 222. The locking bricks 222 are arranged between the cast tube 218 and a crown casting 224. The locking bricks 222 prevent the crown 216 (which is supported by the crown casting 224) from falling down and also transfer the weight of the crown casting 224 to a lower outside ring 226 on the heating unit 204. The ring of locking bricks 222 is suspended and cantilevered in a way that leaves a clear space under the crown 216 to provide access to the crucible unit 102. The crown suspension system 210 greatly reduces the amount of down time required to change the crucible unit 102 and eliminates need for removing electrical components during service.

As shown in FIGS. 2A-2D, the heating unit 204 includes the torsion box door system 212 which has a door 228 attached to a cantilevered arm 230 in a manner that allows the door 228 to be adjusted in-and-out, up-and-down, as well as sideways. The cantilevered arm 230 has a hinge 232 which is connected to a body 234 of the heating unit 204. The cantilevered arm 230 rotates on the hinge 232 over a central axis to allow the door 228 to be moved to cover an opening in the heating unit 204 or to allow the door 228 to be moved away from the opening in the heating unit 204. The door system 212 makes it easy to change the crucible unit 202 and allow unobstructed access to the heating elements 208. The door system 212 is a marked-improvement over the traditional door systems that utilize tracks and wheels which fail to create a tight seal and are prone to energy leakage. Plus, the door system 212 is a marked-improvement over the traditional rear-hinge door systems which prevent easy access to the heating elements 208 located in the top of the furnace unit 204.

Figure 2E:
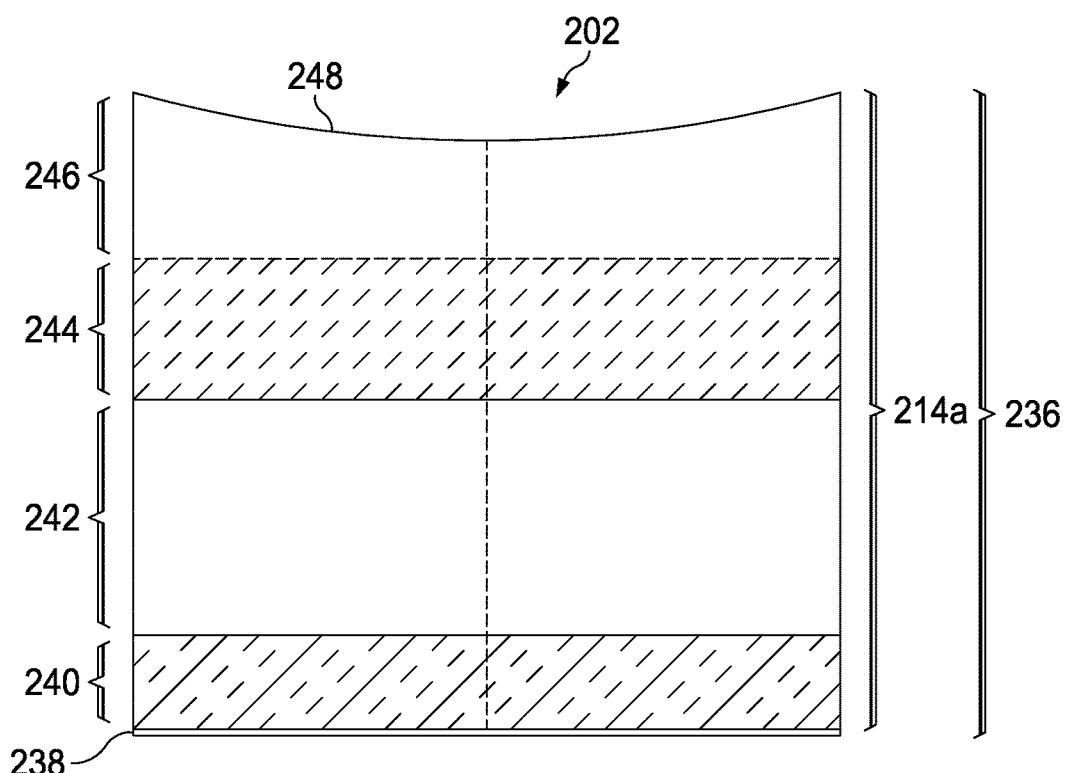

As shown in FIGS. 2B and 2E-2G, the crucible unit 202 and the heating element 204 incorporate specially designed insulation packages 214a, 214b and 214c that help to prevent the interior of the electric furnace 102 from becoming too cold or too hot during the melting operation. In this example, the electric furnace 102 would normally have an internal operating temperature in a range of about 1120° C. to 1250° C. In FIG. 2E, the crucible unit 202 is shown to have a furnace crucible floor 236 which is made from an outer panel 238 and a specially designed insulation package 214a. In this example, the specially designed insulation package 214a includes a microporus panel 240 (approximately 1" thick) located next to the outer panel 238, a fire brick 242 (approximately 2½" thick) located next to the microporus panel 240, a low cement castable layer 244 (e.g., 1½" thick intracast MZ 244) located next to the fire brick 242, and a crucible material 246 (e.g., 1½" thick cast mullite 246) located next to the low cement castable layer 244. The crucible material 246 has an outer face 248 which is exposed to the heat.

Figure 2F:
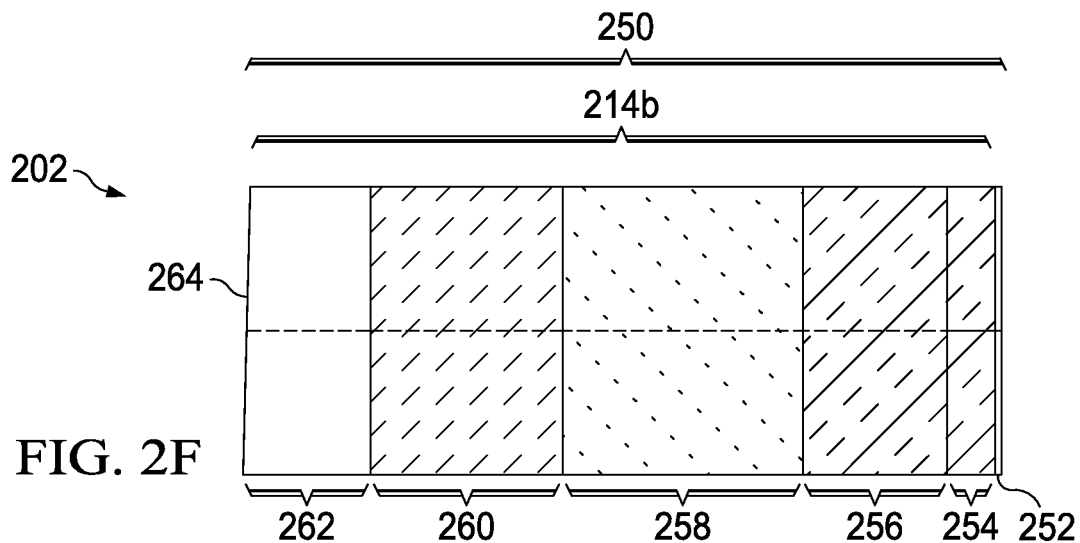

In FIG. 2F, the crucible unit 202 is shown to have a furnace crucible wall 250 which is made from an outer panel 252 and a specially designed insulation package 214b. In this example, the specially designed insulation package 214b includes a microporus panel 254 (approximately ½" thick) located next to the outer panel 252, a ceramic fiber layer 256 (e.g., 1½" thick HP fiber frax 256) located next to the microporus panel 254, a fire brick 258 (approximately 2½" thick) located next the ceramic fiber layer 256, a low cement castable layer 260 (e.g., 2" thick intracast MZ 260) located next to the fire brick 258, and a crucible material 262 (e.g., 2" thick cast mullite 262) located next to the low cement castable layer 260. The crucible material 262 has an outer face 264 which is exposed to the heat.

Figure 2G:
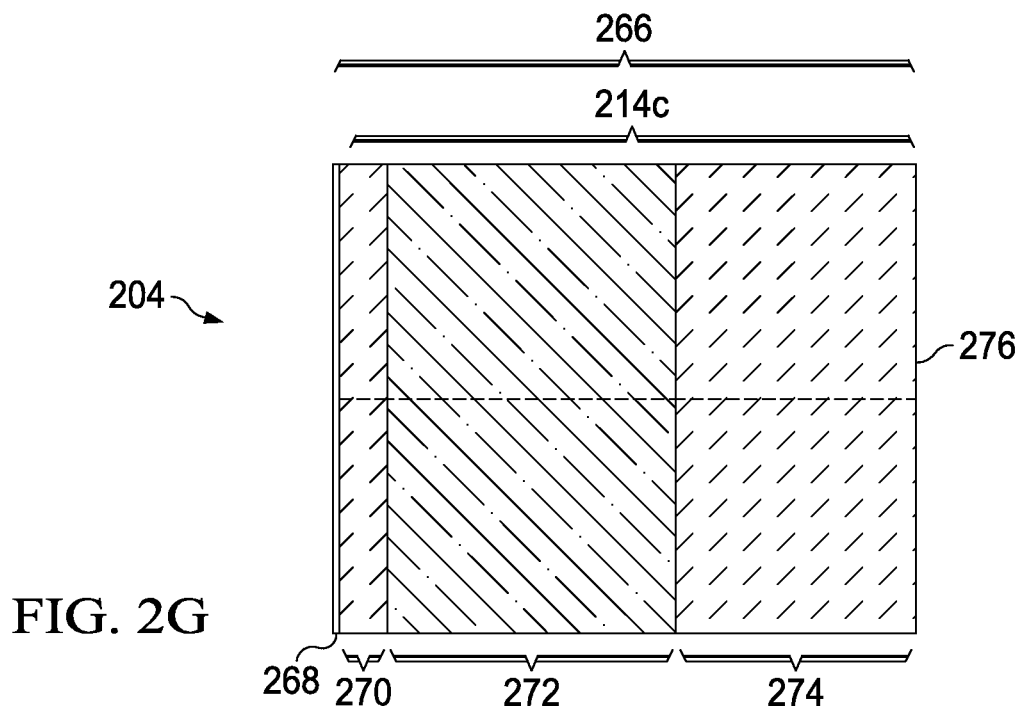

In FIG. 2G, the heating unit 204 is shown to have a furnace crown wall 266 which is made from an outer panel 268 and a specially designed insulation package 214c. In this example, the specially designed insulation package 214c includes a microporus panel 270 (approximately ½" thick) located next to the outer panel 268, a ceramic fiber layer 272 (e.g., 3" thick HP fiber frax 272) located next to the microporus panel 270, and a low cement castable layer 274 (e.g., 2½" thick intracast MZ 274) located next to the ceramic fiber layer 272. The low cement castable layer 274 has an outer face 276 which is exposed to the heat.

Referring to FIGS. 3A-3M, there are several different diagrams illustrating in greater detail the exemplary electric glory hole 104 in accordance with an embodiment of the present invention. The electric glory hole 104 is mounted on a structure 301 and includes a body 302 with an opening 304 through which a pipe holding molten glass can be inserted and then manipulated to form the desired glass shape (see FIGS. 3A-3D). The electric glory hole 104 includes an electrical control box 306 which supplies the required electricity to one or more heating elements 308 (see FIGS. 3A-3D). The electric glory hole 104 includes other components but only the components like a specially designed door system 310, specially designed refractory element baffles 312, a video camera 314 and specially designed insulation packages 316a, 316b and 316c which are relevant to the present discussion are described in detail below.

As shown in FIGS. 3A-3F, the electric glory hole 104 includes the specially designed door system 310 which has three doors 318, 320 and 322 where the first door 318 is hung upon the body 302 and at least partially covers the opening 304, the second door 320 is hung upon the first door 318, and the third door 322 is hung upon the second door 320. The first door 318 is larger than the second door 320 which in turn is larger than the third door 322. In this example, the first door 318 has a first hinged side 324a and a second hinged side 324b, where the first hinged side 324a has a first frame 326a that receives and supports one or more cast blocks 328a and 328a' (two shown) and the second hinged side 324b has a second frame 326b that receives and supports one or more cast blocks 328b and 328b' (two shown)(see FIGS. 3E-3F). The second door 320 has a first hinged side 330a and a second hinged side 330b, where the first hinged side 330a has a first frame 332a that receives and supports one or more cast blocks 334a and 334a' (two shown) and the second hinged side 330b has a second frame 332b that receives and supports one or more cast blocks 334b and 334b'. Likewise, the third door 322 has a first hinged side 336a and a second hinged side 336b, where the first hinged side 336a has a first frame 338a that receives and supports one or more cast blocks 340a and 340a' (two shown) and the second hinged side 336b has a second frame 338b that receives and supports one or more cast blocks 340b and 340b'.

The doors 318, 320 and 322 can be easily kept in optimal condition and thus allow minimal energy loss since if any of the cast blocks 328a, 328a', 328b, 328b', 334a, 334a', 334b, 334b', 340a, 340a', 340b and 340b' have to be replaced then all one needs to do is remove the damaged cast block from the frame 324a, 324b, 332a, 332b, 338a and 338b and insert the new cast block. For instance, if the first door 318 had a damaged cast block 328a' then one would remove pins 342a and 342b from the first frame 326a and slide-out the damaged cast block 328a' (see FIGS. 3E and 3F). Then, the new cast block 328a' can be placed in the first frame 326a and the pins 342a and 342b re-inserted to hold the new cast block 328a'.

Figure 3A:
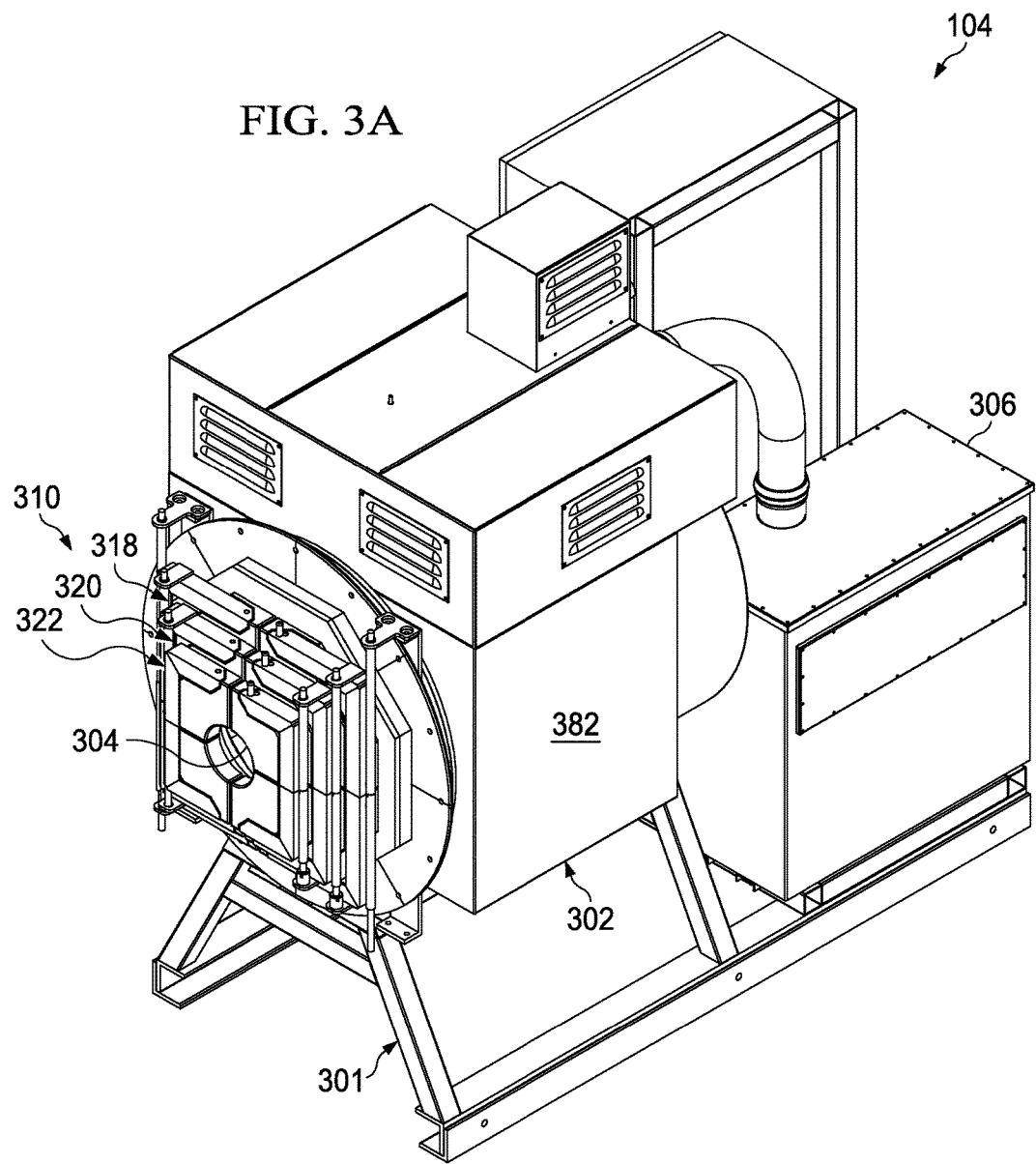
Figure 3B:
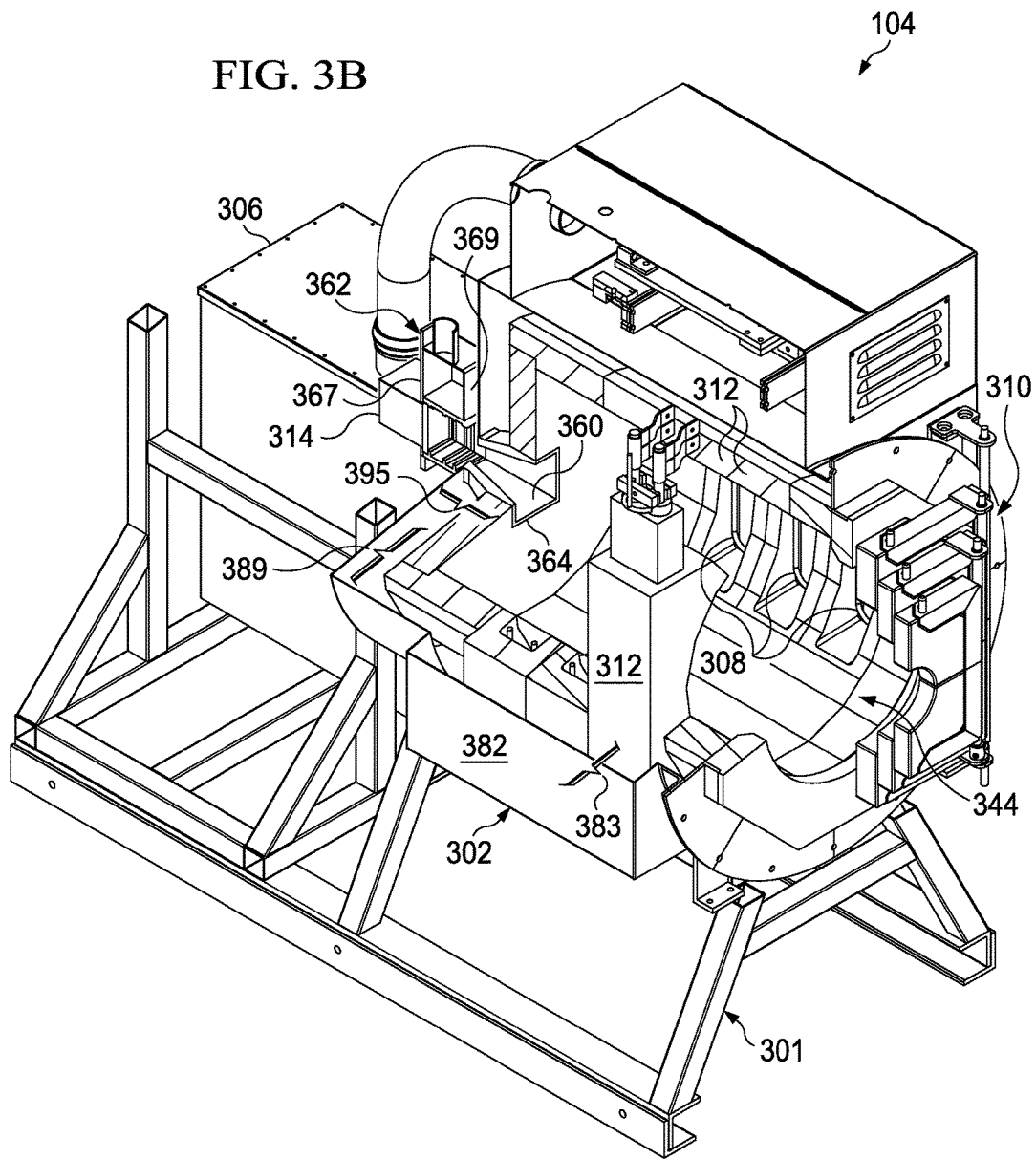
Figure 3D:
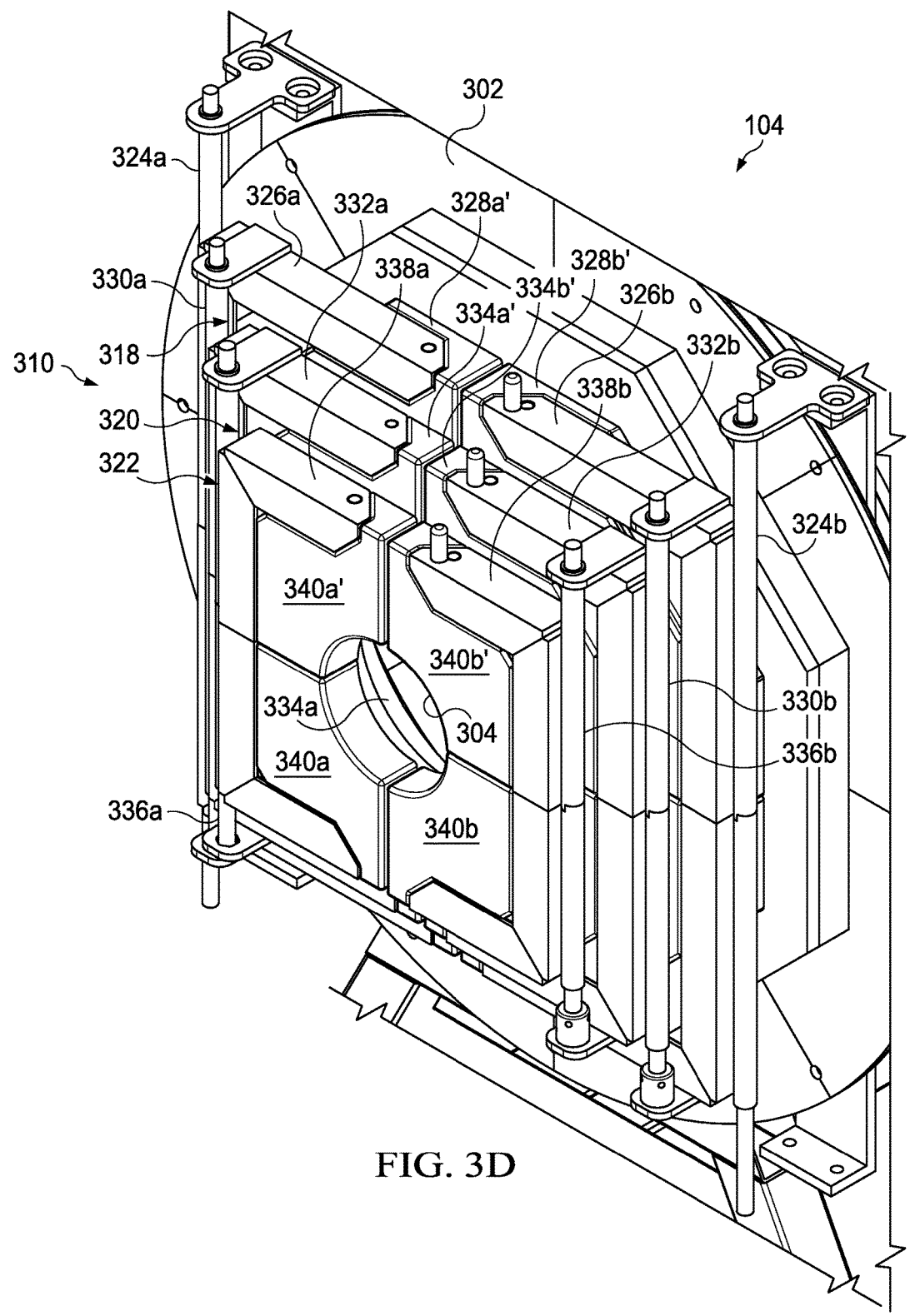
Figure 3E:
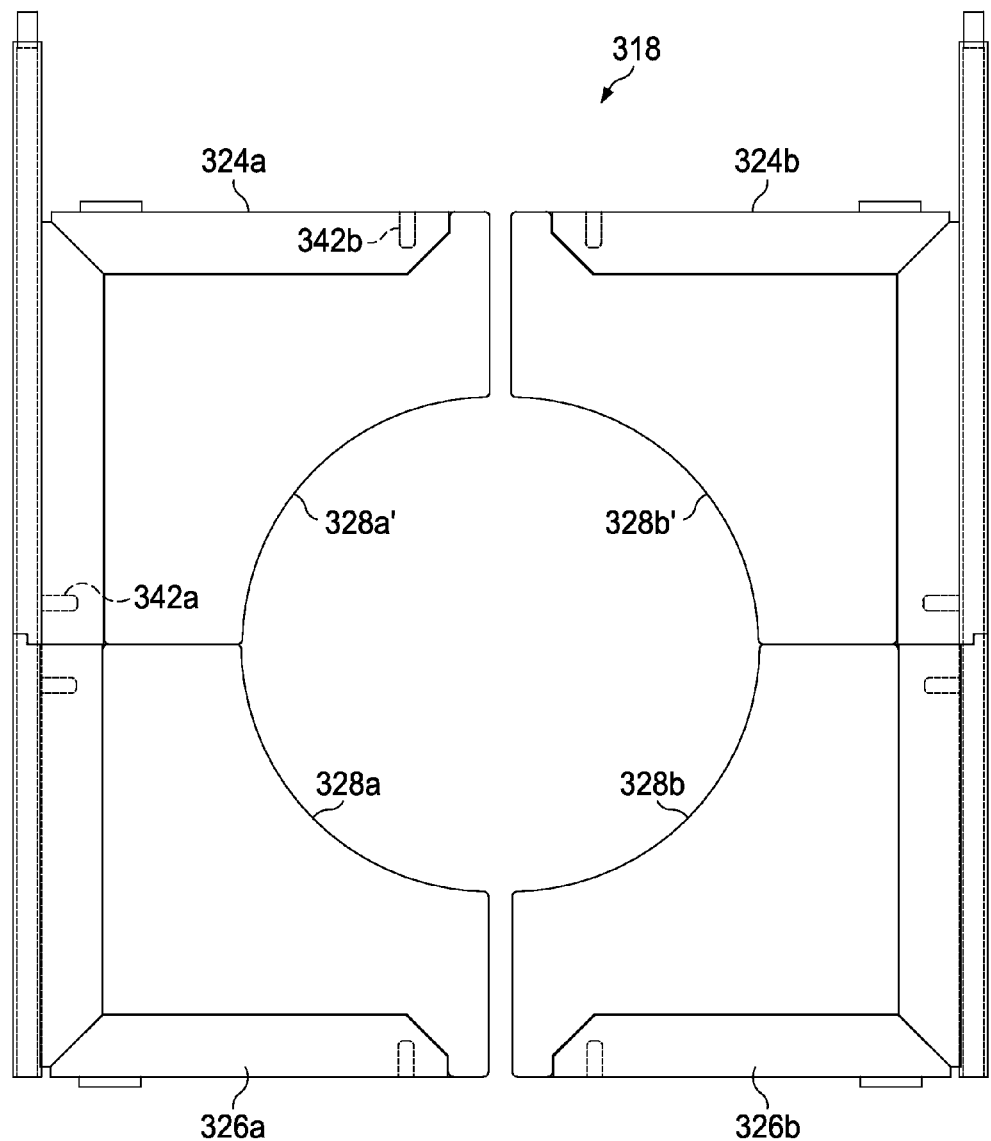
Figure 3F:
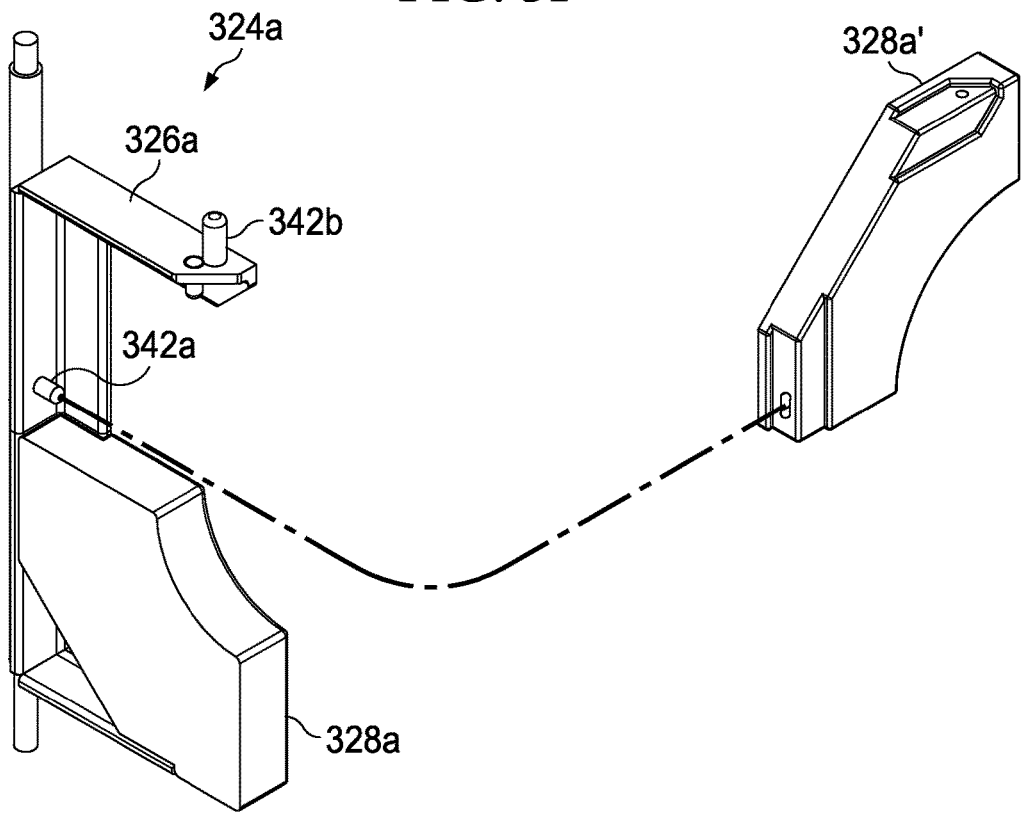
Figure 3G:
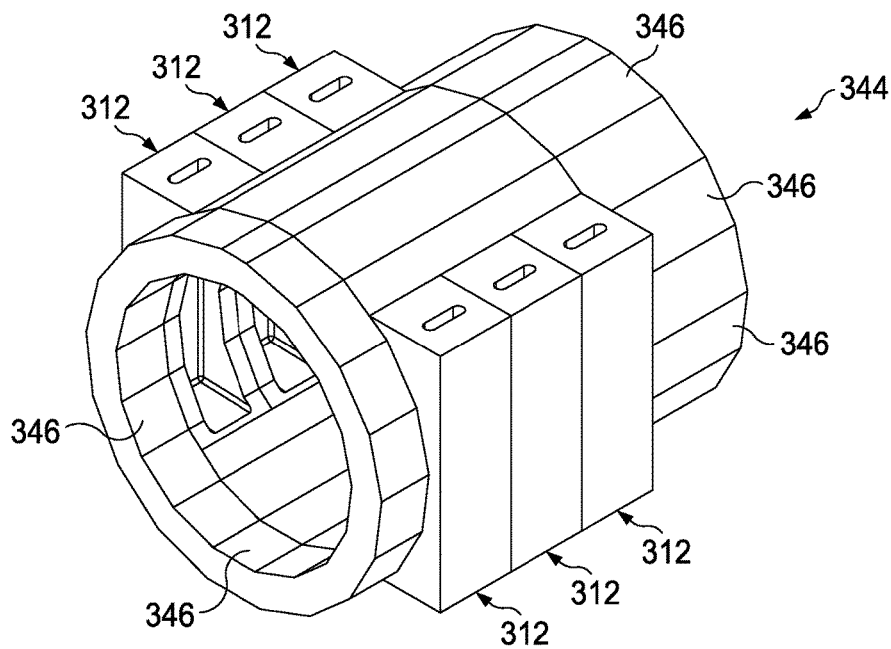
Figure 3H:
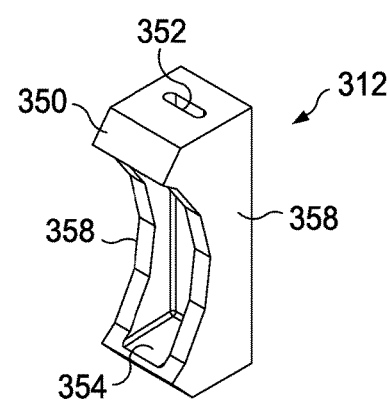
Figure 3I:
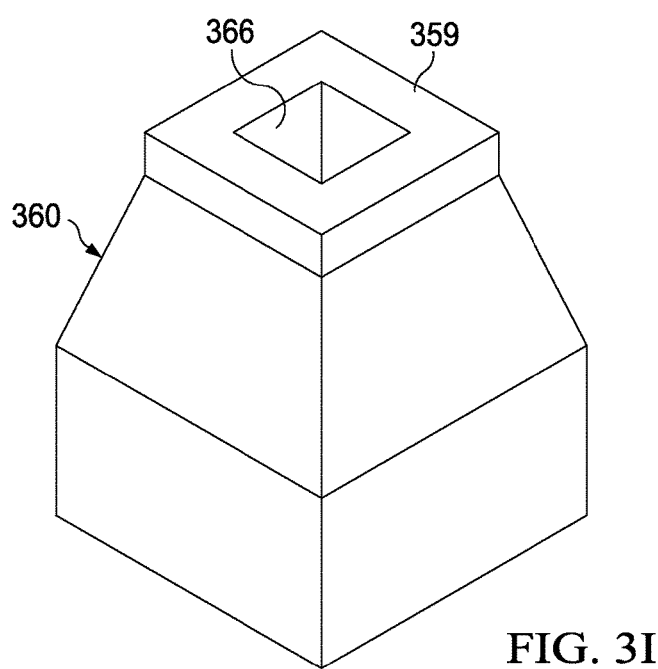
Figure 3J:
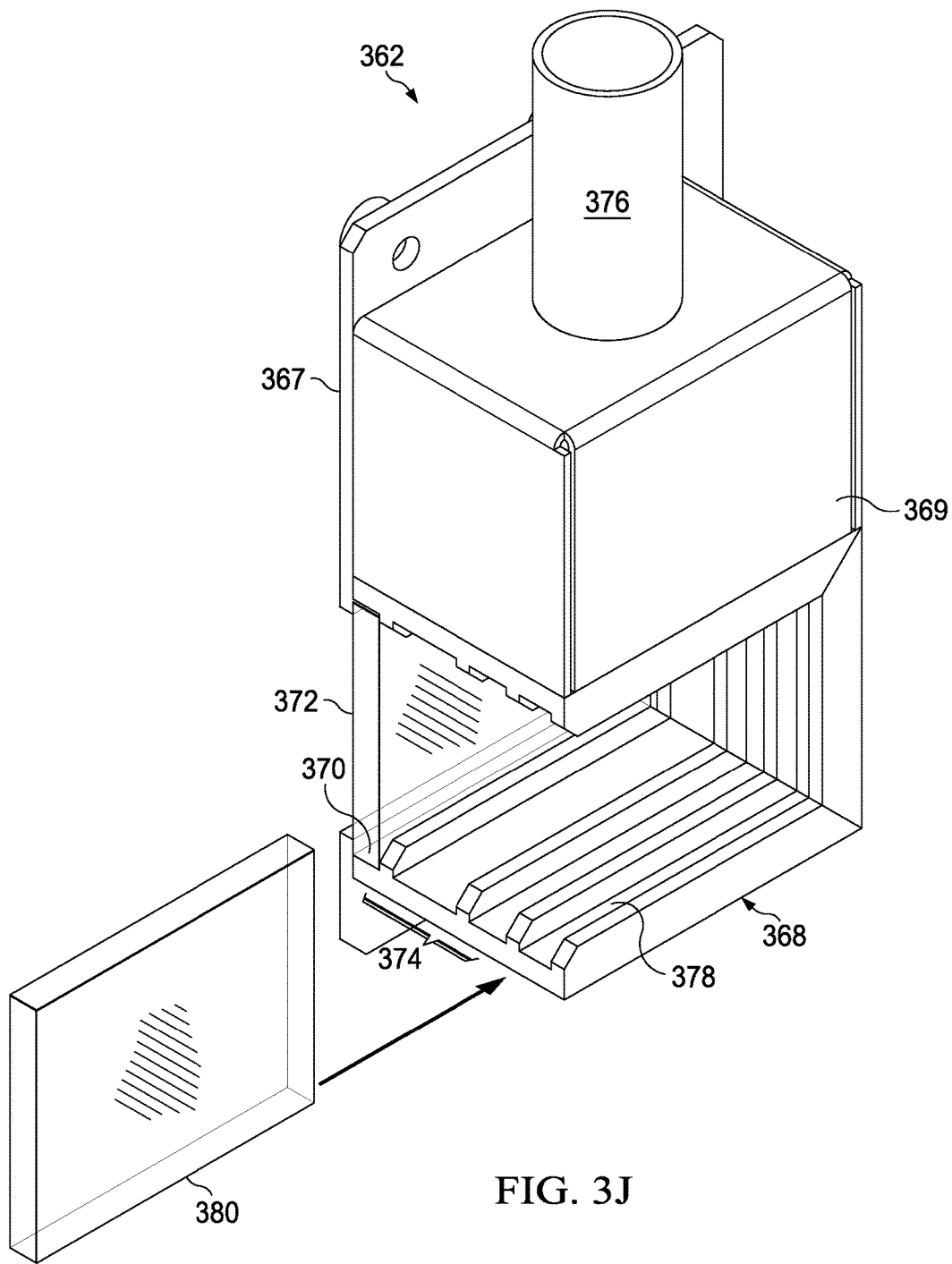

As shown in FIGS. 3B-3C and 3G, the electric glory hole 104 has a core 344 which is sized and configured to enable a pipe holding molten glass to be inserted therein through the opening 304. The core 344 is formed from interconnected fire bricks 346 and a series of refractory element baffles 312. In FIG. 3H, there is shown a perspective view of exemplary refractory element baffle 312 that includes a block 350 which has a passage 352 located in a top thereof and a cavity 354 formed in a side thereof. The passage 352 is sized to receive a heating element 308 (e.g., molybdenum discilicide heating element 308) which is inserted at least partially there through and the cavity 354 is sized to encompass and protect at least three sides of the heating element 308 (see FIGS. 3B-3C). In particular, the refractory element baffle 312 has sides 358 which protect the heating element 308 located and hanging within the cavity 354 such that when the pipe is inserted within the core 344 it will not be able to touch and damage the heating element 308. Plus, the refractory element baffle 312 with the specially shaped cavity 354 creates a high temperature shell around the heating element 308 that reflects energy into the core 344. In one embodiment, the refractory element baffle 312 is cast from a 3000° F. dense refractory and the cavity 354 where the heating element 308 hangs is approximately ½" larger than the heating element 308. Plus, the heating element 308 when installed is recessed about 1 inch from the inner edges of the cavity 354. The refractory element baffle 312 solves the problem of having the heating element 308 to close to the pipe and helps to reduce the potential damage to the heating element 308 as well as reduce the potential hazard due to an electric shock and short circuit.

As shown in FIGS. 3B-3C and 3I-3J, the electric glory hole 104 has a video camera 314 attached thereto so that it is isolated from the heat inside the core 344. The video camera 314 is used to demonstrate what takes place inside the core 344 when the molten glass is re-heated on the pipe. In this example, the video camera 314 connects to one side 367 of a lens holder 362 which has another side 369 attached to a camera casting 360 (see FIGS. 3I and 3J). The camera casting 360 is a cast refractory block that is located within an opening 364 in the body 302. The camera casting 360 has a tapered opening 366 in communication with the core 344, where the tapered opening 366 is sized to allow adequate visual inspection of the glory hole interior from behind the back wall of the body 302. The lens holder 362 includes a heat block seal 368 that has a groove 370 which holds a lens 372 (e.g., 2"×2" high temperature quartz lens 372) followed by an air purge gap 374 (which is supplied gas from a gas purge system 376) which is followed by another groove 378 within which is placed a glass filter lens 380. The quartz lens 372 (located next to the video camera 314) prevents hot corrosive gases located inside the core 344 from attacking the video camera 314. The glass filter lens 380 (located next to the camera casting 360) shields the video camera 314 from heat transferred from the lens 372. In one example, the video camera 358 would be mounted within 1" of the glass filter lens 380.

Figure 3K:
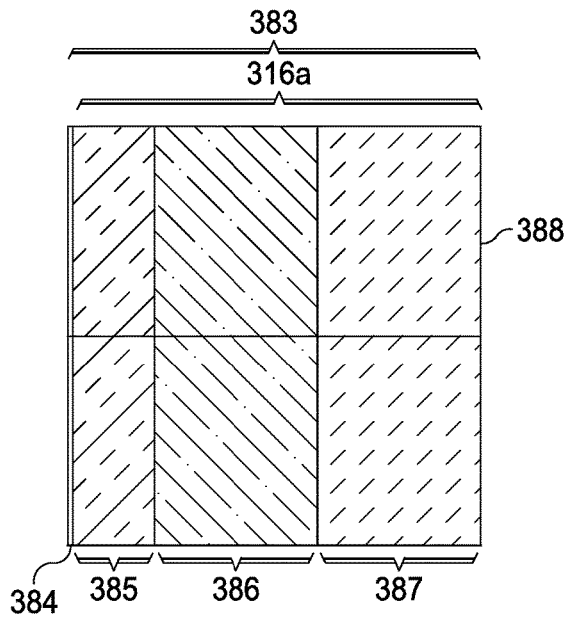

As shown in FIGS. 3B-3C and 3K-3M, the electric glory hole 104 incorporates specially designed insulation packages 316a, 316b and 316c that help limit the temperature of the outer shell 382 to be less than 225° F. In FIG. 3K, the electric glory hole 102 is shown to have a glory hole element block wall 383 which is made from an outer panel 384 and a specially designed insulation package 316a. In this example, the specially designed insulation package 316a includes a microporus panel 385 (approximately 1" thick) located next to the outer panel 384, a ceramic fiber layer 386 (e.g., 2" thick HP fiber frax 386) located next to the microporus panel 385, a low cement castable layer 387 (e.g., 2" thick intracast MZ 387) located next to the ceramic fiber layer 386. The low cement castable layer 387 has an outer face 388 which is exposed to the heat.

Figure 3L:
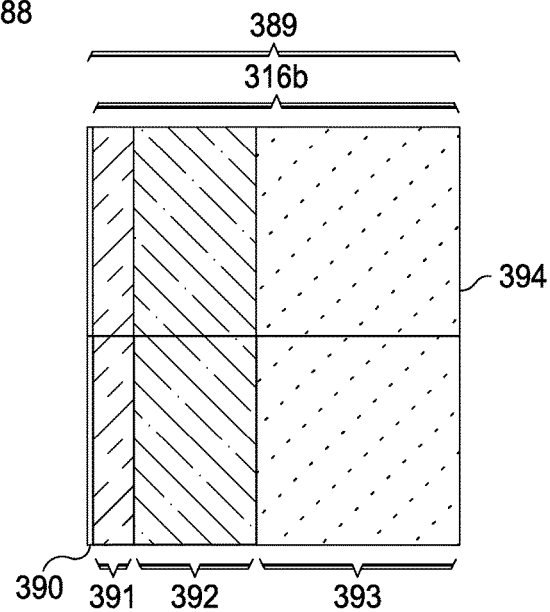

In FIG. 3L, electric glory hole 102 is shown to have a glory hole wall 389 which is made from an outer panel 390 and a specially designed insulation package 316b. In this example, the specially designed insulation package 316b includes a microporus panel 391 (approximately ½" thick) located next to the outer panel 390, a ceramic fiber layer 392 (e.g., 1½" thick HP fiber frax 392) located next to the microporus panel 391, a fire brick 393 (approximately 2½" thick) located next to the ceramic fiber layer 392. The fire brick 393 has an outer face 394 which is exposed to the heat.

Figure 3M:
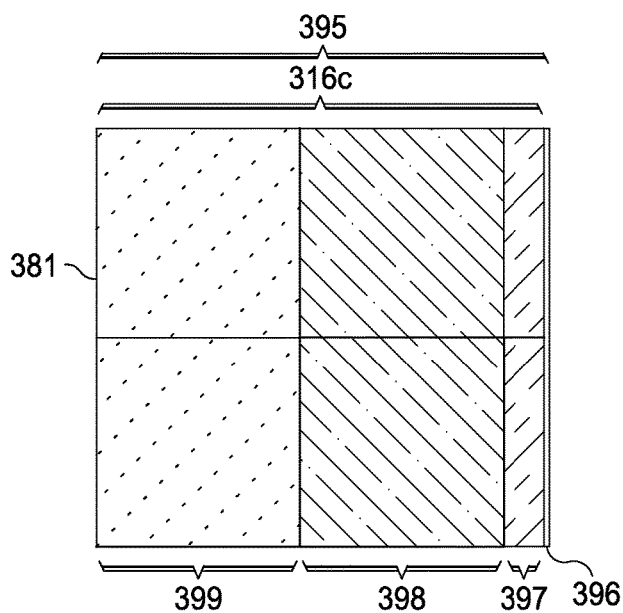

In FIG. 3M, electric glory hole 102 is shown to have a glory hole back wall 395 which is made from an outer panel 396 and a specially designed insulation package 316c. In this example, the specially designed insulation package 316c includes a microporus panel 397 (approximately ½" thick) located next to the outer panel 396, a ceramic fiber layer 398 (e.g., 2½" thick HP fiber frax 398) located next to the microporus panel 397, a fire brick 399 (approximately 2½" thick) located next the ceramic fiber layer 398. The fire brick 399 has an outer face 381 which is exposed to the heat.

Figure 4A:
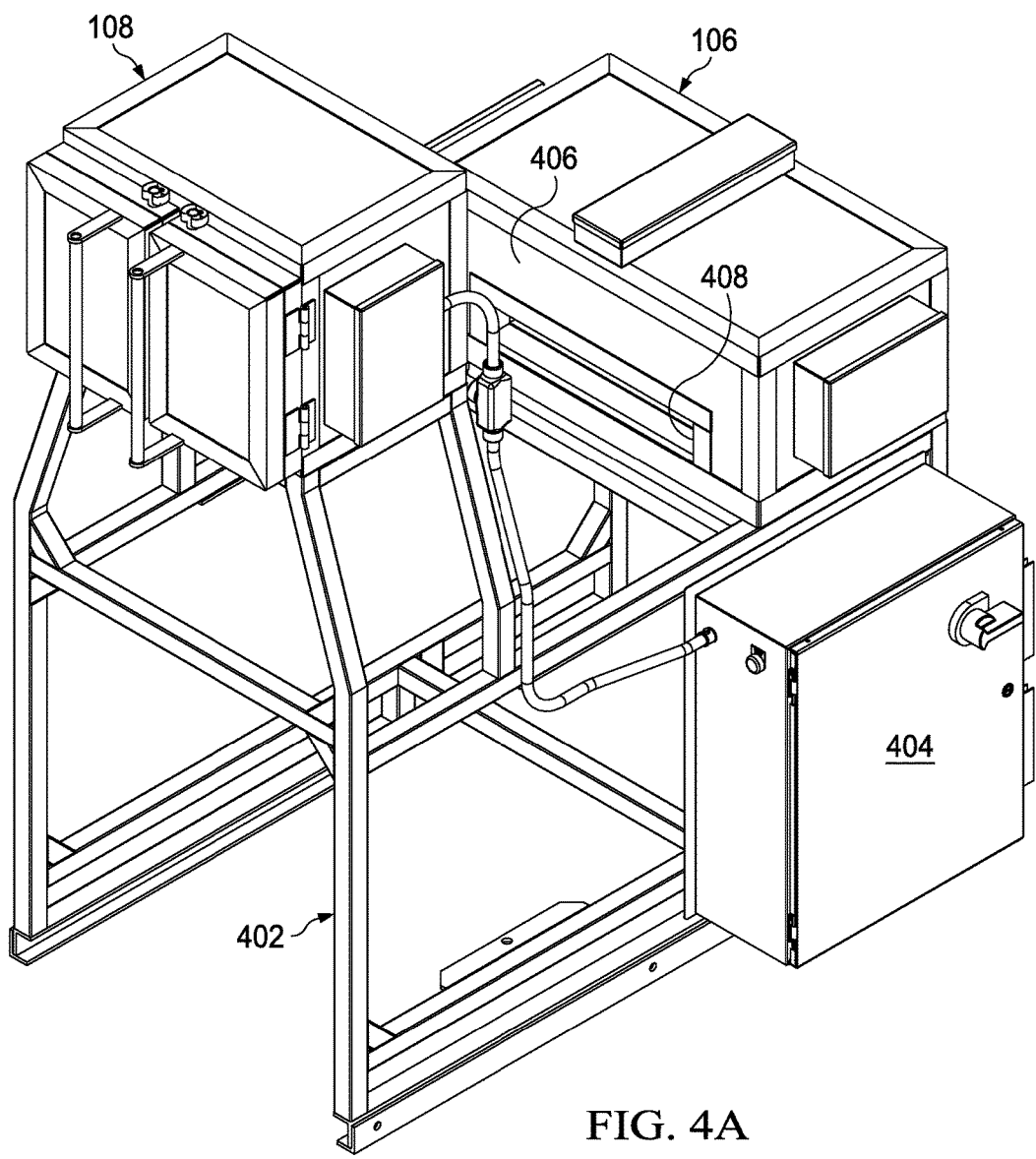
FIGS. 4A-4B are different diagrams illustrating in greater detail the exemplary electric pipe warmer and the exemplary electric color box shown in FIG. 1 in accordance with an embodiment of the present invention.
Figure 4B:
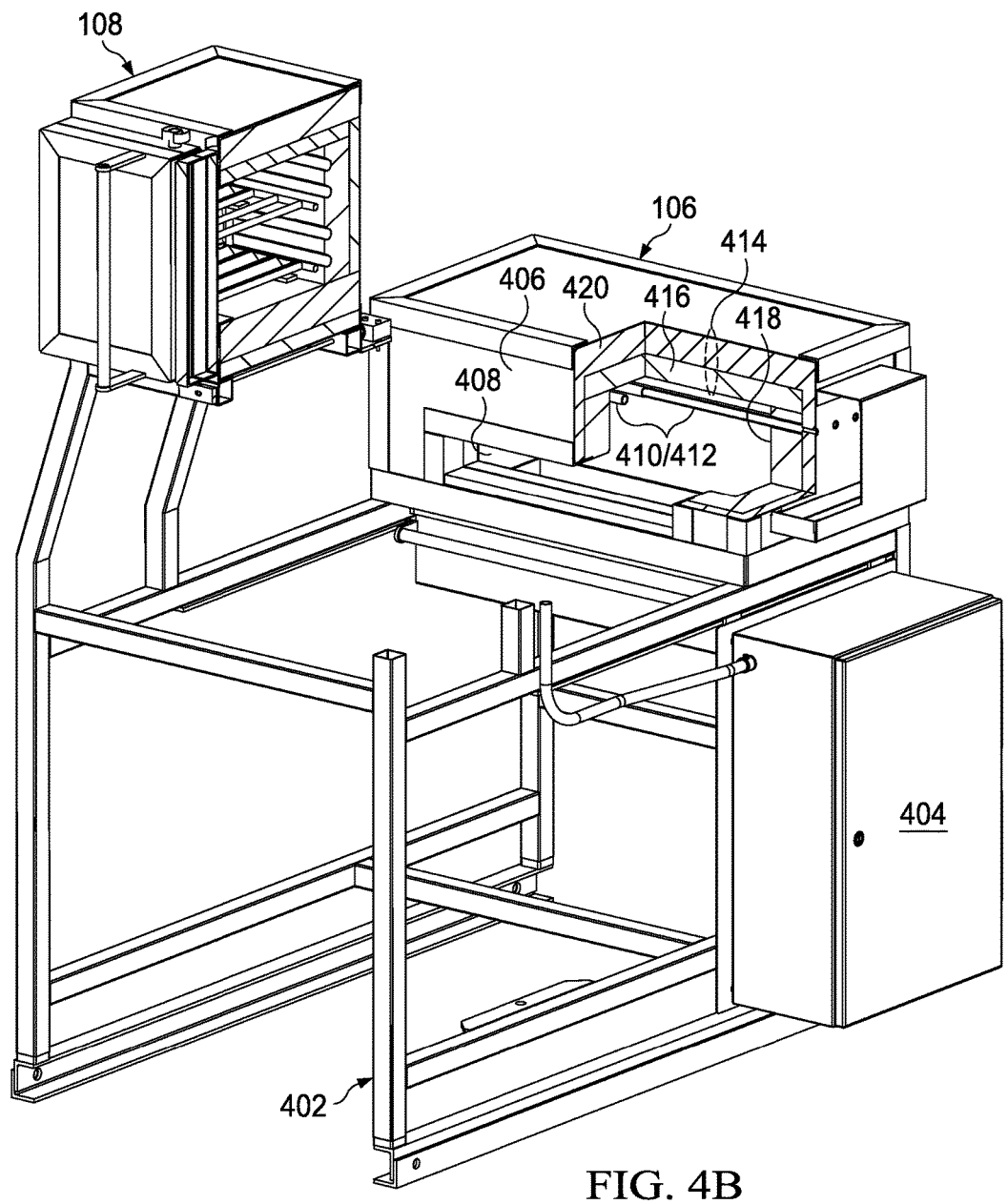

Referring to FIGS. 4A-4B, there are several diagrams illustrating in greater detail the exemplary electric pipe warmer 106 and the exemplary electric color box 108 in accordance with an embodiment of the present invention. The electric pipe warmer 106 is used to pre-heat the pipe which is used to hold and manipulate the molten glass during the forming process. The electric color box 108 is used to apply colored additives to the molten glass during the forming process. In this example, the electric pipe warmer 106 and the electric color box 108 are both mounted on the same support unit 402 and are both supplied electricity from one electrical control box 404. The electric pipe warmer 106 includes a body 406 with a pipe opening 408 formed therein and one or more heating elements 410 located therein. The pipe opening 408 is sized and positioned such that when a pipe is inserted therein the pipe will not be able to contact the heating elements 410. In this example, the pipe opening 408 is located near the bottom of the body 406 and the heating elements 410 are attached to the roof of the body 406. The heating elements 410 are attached to the roof because glass sheds that fall off the pipe during the heating process would damage the heating elements 410 if they where located near the bottom or sides of the body 406. The heating elements 410 can be nichrome elements which run through protective quartz tubes 412. The nichrome heating elements 410 can radiate at 2000° F. The electric pipe warmer 106 also includes a specially designed insulation package 414 which includes fire bricks 416 (e.g., 2300° F. fire bricks 416) which are coated with a high emissivity coating 418 that is exposed to the heat and helps to increase the heat transfer into cold pipes. The fire bricks 416 are located next to a ceramic fiber 420 (e.g., 1" thick ceramic fiber 420) which is coating the internal portion of the body 406.

Referring to FIGS. 5A-5G, there are several diagrams illustrating in greater detail the exemplary electric annealer 110 in accordance with an embodiment of the present invention. The electric annealer 110 is used to anneal the formed glass. In this example, the electric annealer 110 is mounted on a support unit 502 and is supplied electricity from an electrical control box 504. The electric annealer 110 includes a body 506 with an opening 508 formed therein which has a door system 510 attached thereto which when opened provides access to the interior of the body 506 and when closed prevents access to the interior of the body 506. The door system 510 includes a door 512, a frame 514, a gasket 516 and a keeper 518, where the door 512 is attached to the frame 514 which is attached to the gasket 516 which is attached to the keeper 518 which is attached to the body 506 (see FIG. 5C). The configuration of the door system 510 is desirable since the gasket 516 (e.g., tadpole silica gasket 516) is kept cool and has minimal exposure to abrasion because it is positioned between the frame 514 and the keeper 518. In addition, the electric annealer 110 has one or more electrical heating elements 520 located in the body 506 which radiate heat to anneal the formed glass.

Figure 5A:
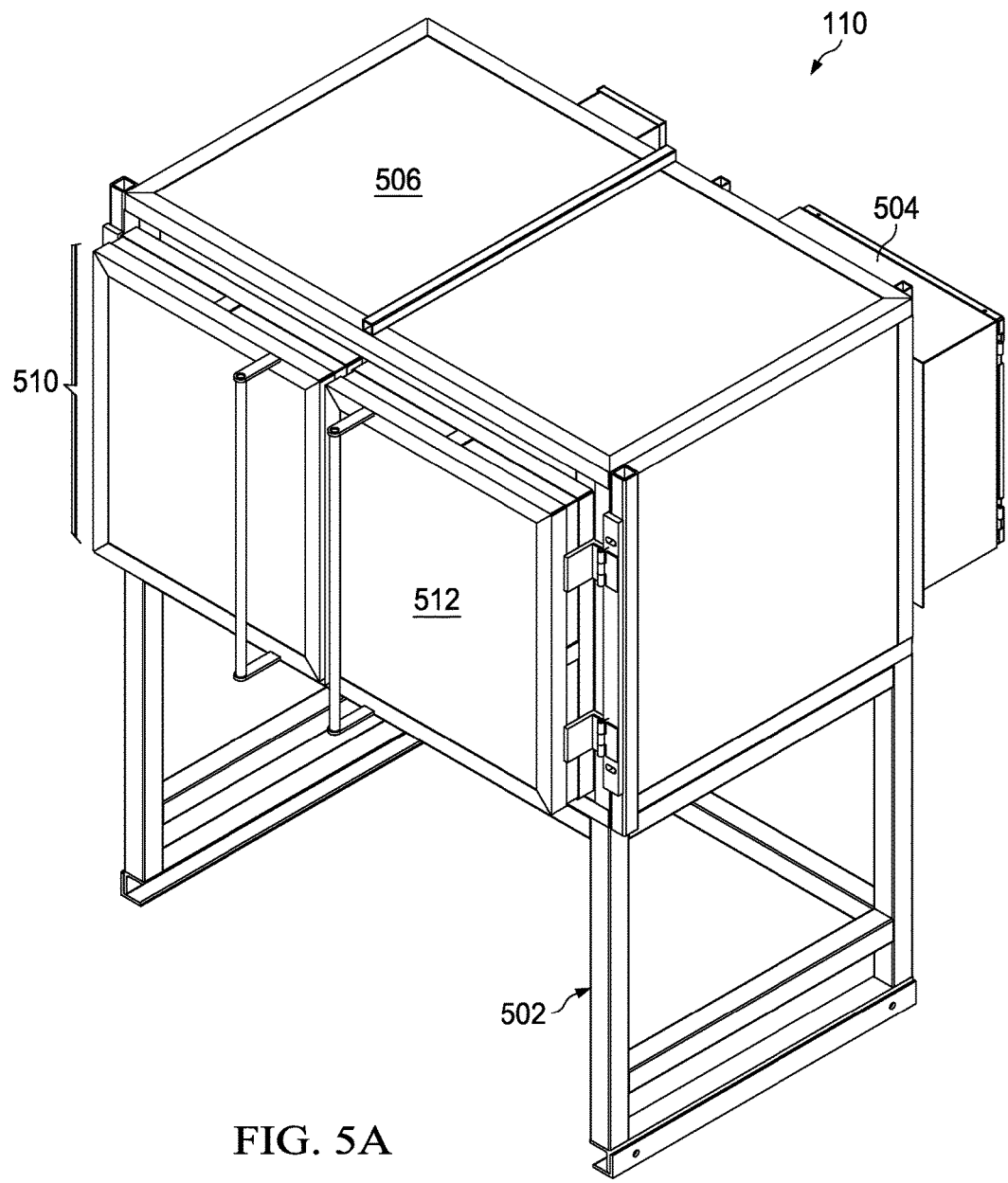
FIGS. 5A-5G are different diagrams illustrating in greater detail the exemplary electric annealer shown in FIG. 1 in accordance with an embodiment of the present invention.
Figure 5B:
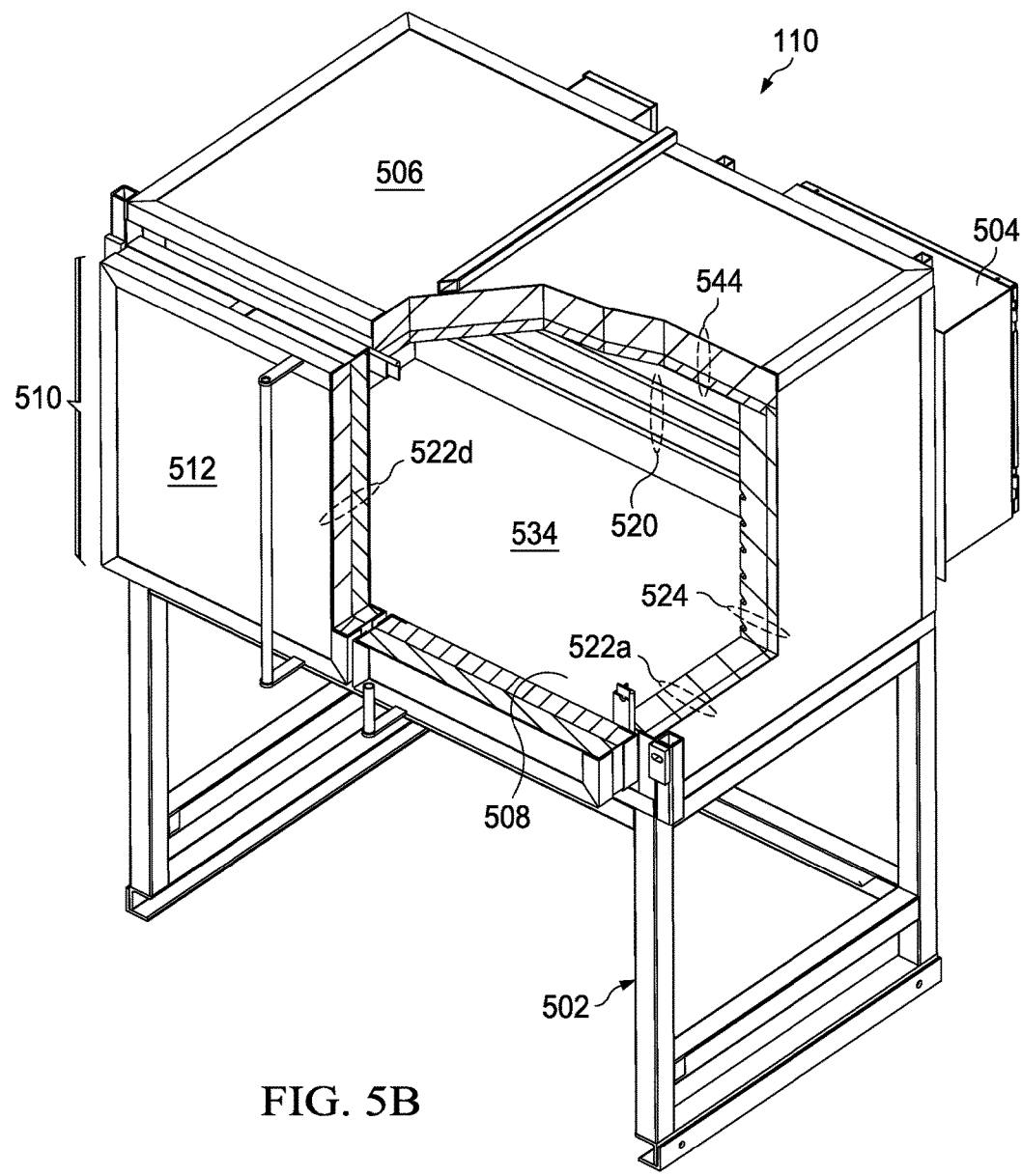
Figure 5C:
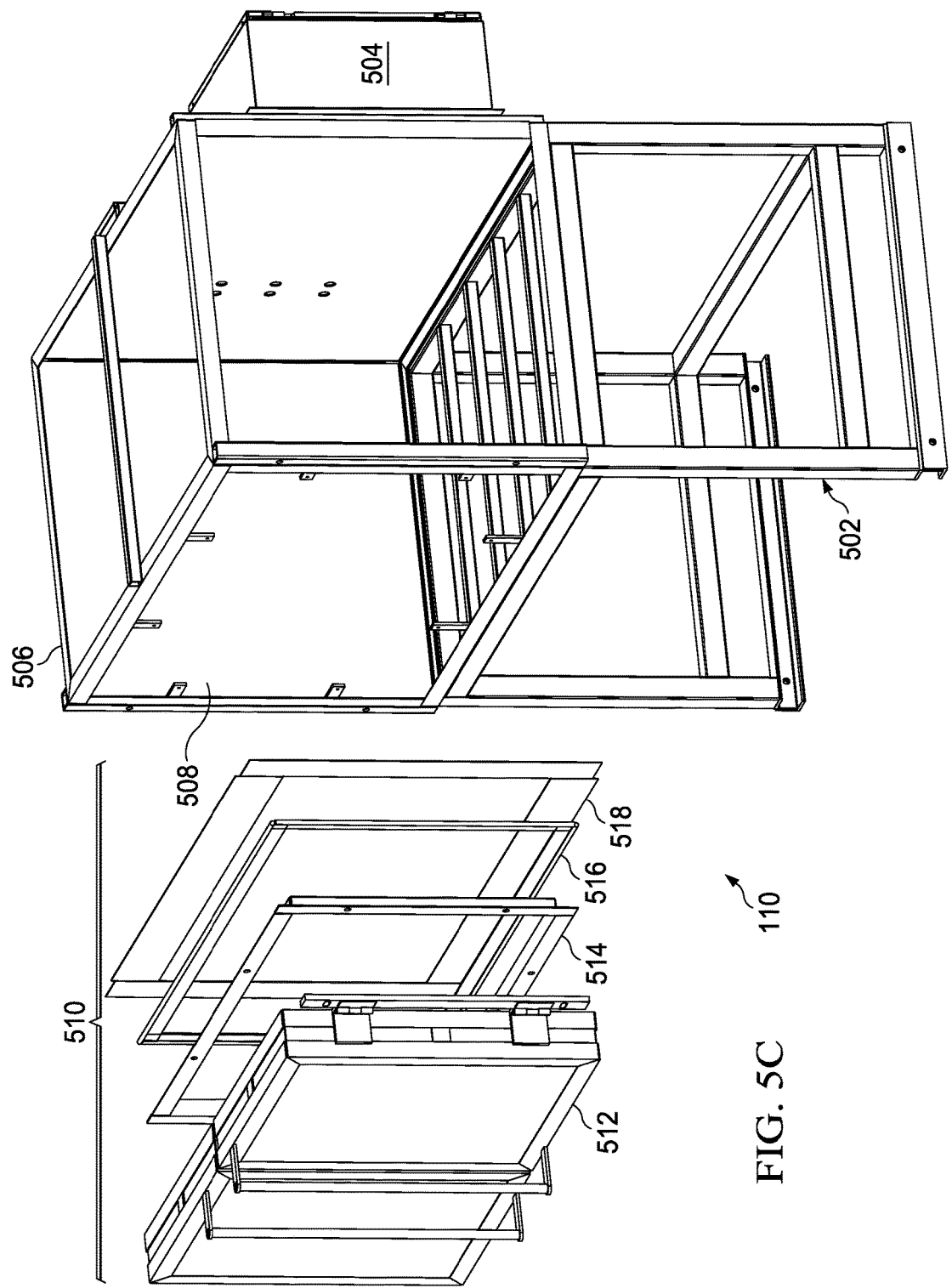
Figure 5D:
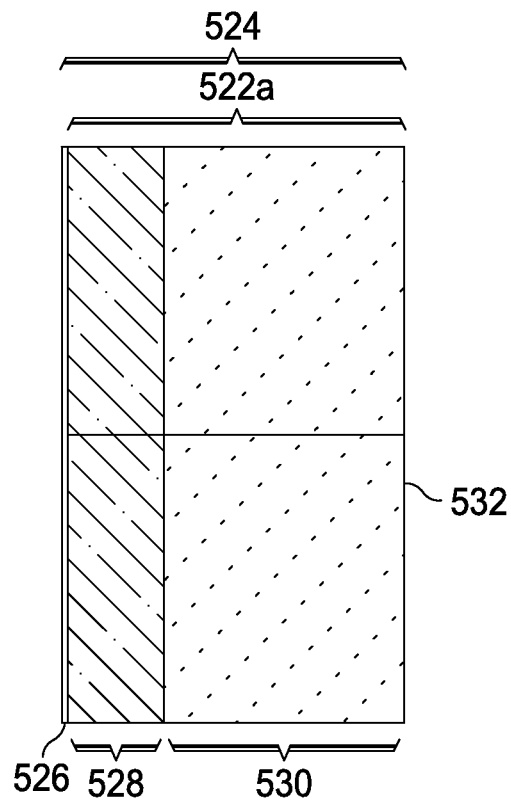

As shown in FIGS. 5B and 5D-5G, the electric annealer 110 also incorporates specially designed insulation packages 522a, 522b, 522c and 522d. In FIG. 5D, the electric annealer 110 has an annealer wall 524 which is made from an outer panel 526 and the specially designed insulation package 522a. In this example, the specially designed insulation package 522a includes a ceramic fiber layer 528 (e.g., 1" thick HP fiber frax 528) located next to the outer panel 526, and a fire brick 530 (approximately 2½" thick) located next to the ceramic fiber layer 528. The fire brick 530 has an outer face 532 which is exposed to the heat.

Figure 5E:
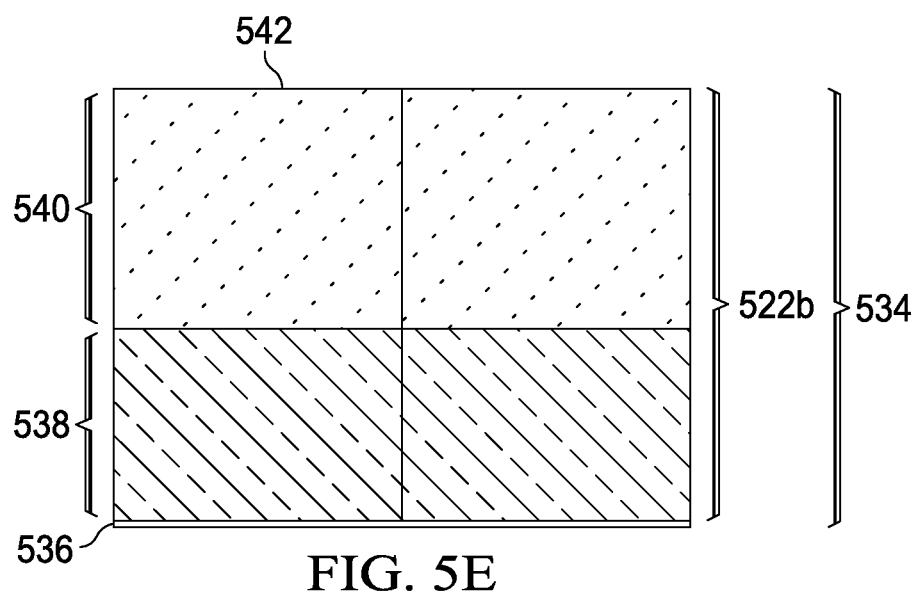

In FIG. 5E, the electric annealer 110 has a floor 534 which is made from an outer panel 536 and the specially designed insulation package 522b. In this example, the specially designed insulation package 522b includes a fiberglass silicate layer 538 (e.g., 2" thick insblock 19 538) located next to the outer panel 536, and a fire brick 540 (approximately 2½" thick) located next to the fiberglass silicate layer 538. The fire brick 540 has an outer face 542 which is exposed to the heat.

Figure 5F:
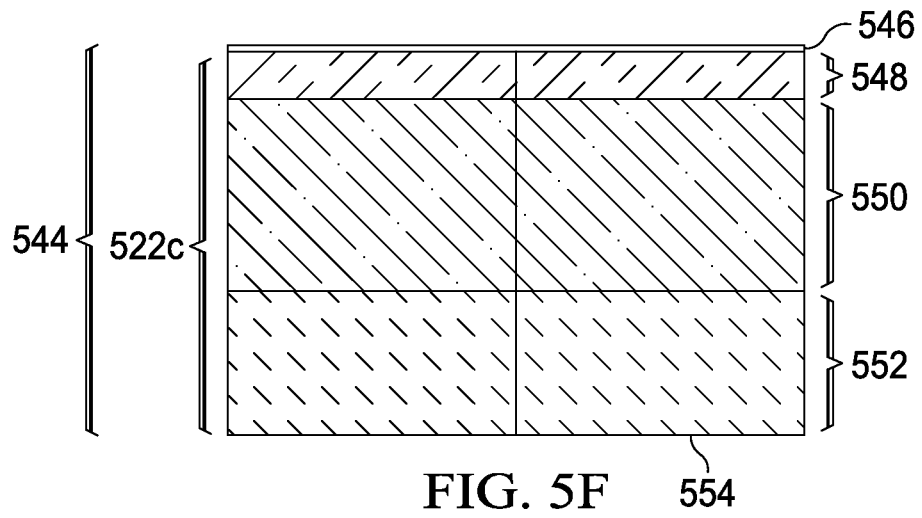

In FIG. 5F, the electric annealer 110 has a ceiling 544 which is made from an outer panel 546 and the specially designed insulation package 522c. In this example, the specially designed insulation package 522c includes a microporus panel 548 (approximately ½" thick) located next to the outer panel 546, a ceramic fiber layer 550 (e.g., 2" thick HP fiber frax 550) located next to the microporus panel 548, and a thermal ceramic layer 552 (e.g., 2" thick M board 552) located next to the ceramic fiber layer 550. The thermal ceramic layer 552 has an outer face 554 which is exposed to the heat.

Figure 5G:
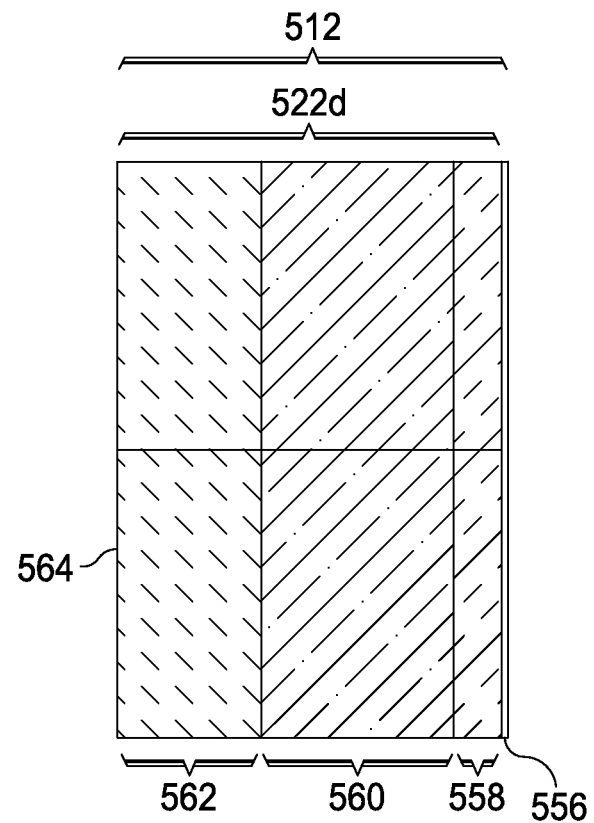

In FIG. 5G, the electric annealer 110 has the door 512 which is made from an outer panel 556 and the specially designed insulation package 522d. In this example, the specially designed insulation package 522d includes a microporus panel 558 (approximately ½" thick) located next to the outer panel 556, a ceramic fiber layer 560 (e.g., 2" thick HP fiber frax 560) located next to the microporus panel 558, and an thermal ceramic layer 562 (e.g., 2" thick M board 562) located next to the ceramic fiber layer 560. The thermal ceramic layer 562 has an outer face 564 which is exposed to the heat.

Referring to FIGS. 6A-6D, there are several diagrams illustrating in greater detail the exemplary electric crucible kiln 112 in accordance with an embodiment of the present invention. The electric crucible kiln 112 is located below the electric annealer 110 and is used to melt small quantities of glass and colored frits, usually less than 50 lbs. In this example, the electric crucible kiln 112 includes a crucible 602, a door system 604 and an electrical control box 606 which supplies electricity to heating elements (not shown) located in the crucible 602. The door system 604 includes a door 608 which is attached to a support arm 610 which has a hinge 612 connected to the crucible 602. The support arm 610 is arranged to rotate on the hinge 612 such that the door 608 can be moved to cover an opening in the crucible 602 or the door 608 can be moved away from the opening in the crucible 602. Alternatively, the door system 604 if desired may be mounted on a side of the crucible 602 rather than on top of the crucible 602 (as shown).

Figure 6A:
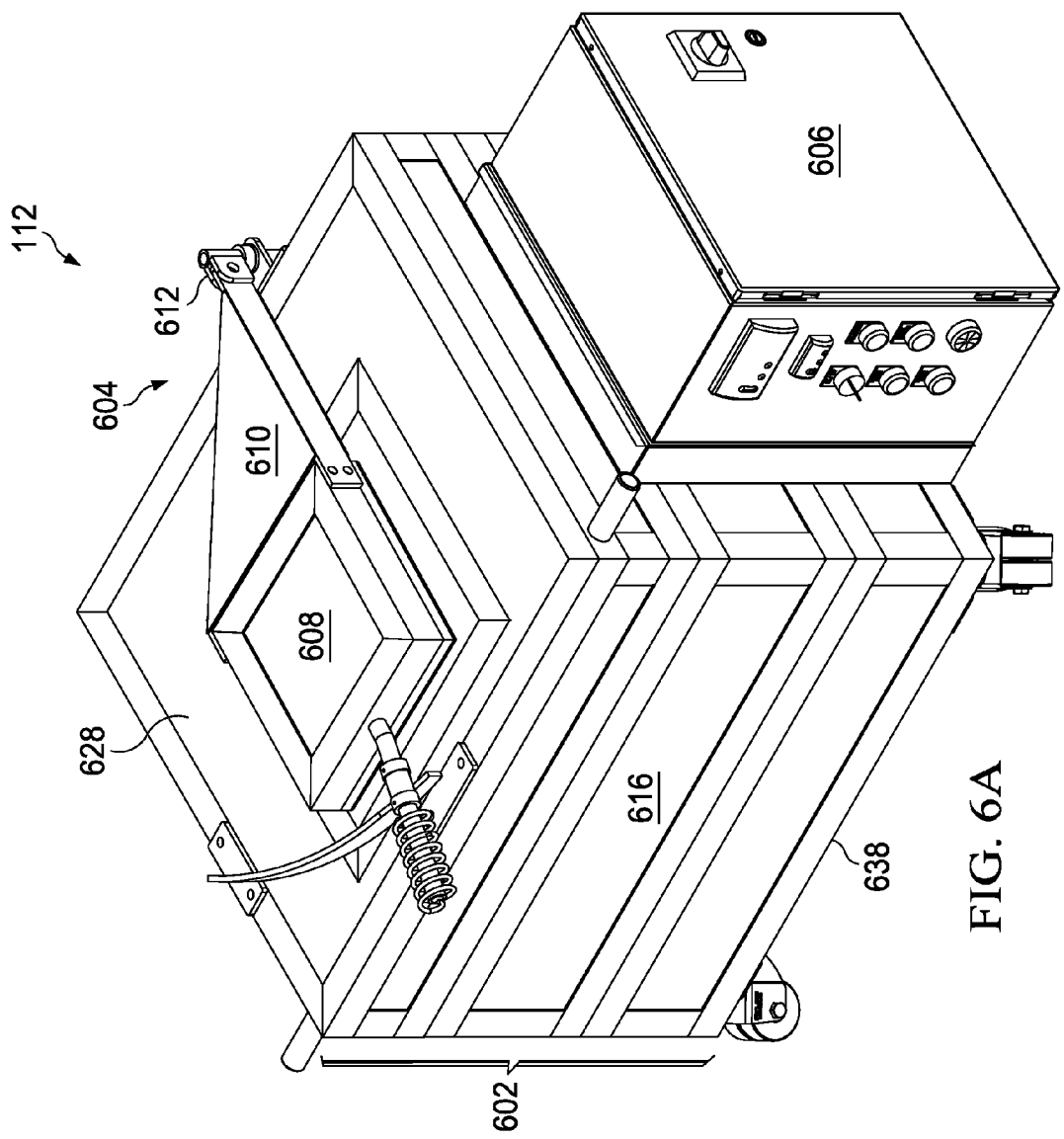
FIGS. 6A-6D are different diagrams illustrating in greater detail the exemplary electric crucible kiln shown in FIG. 1 in accordance with an embodiment of the present invention.
Figure 6D:
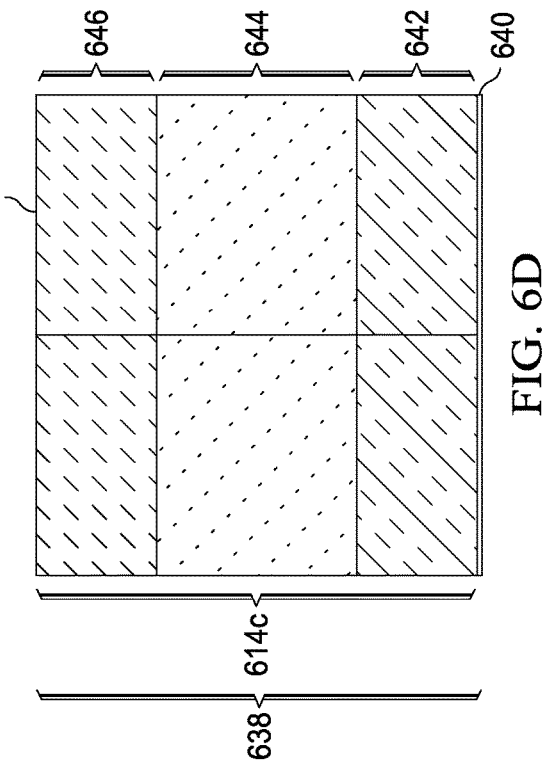
Figure 6C:
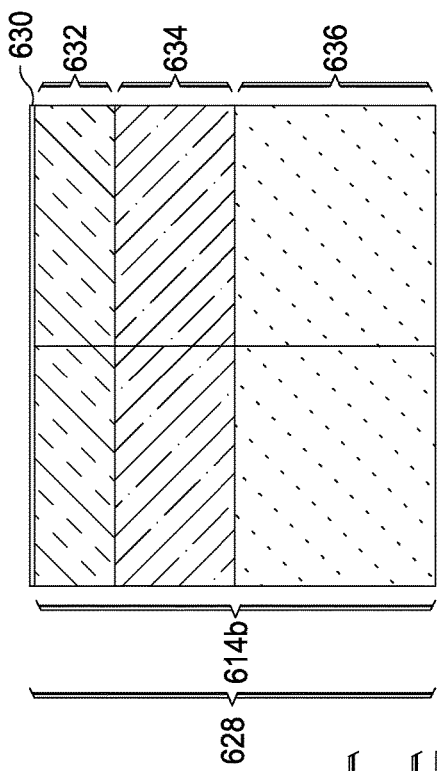
Figure 6B:
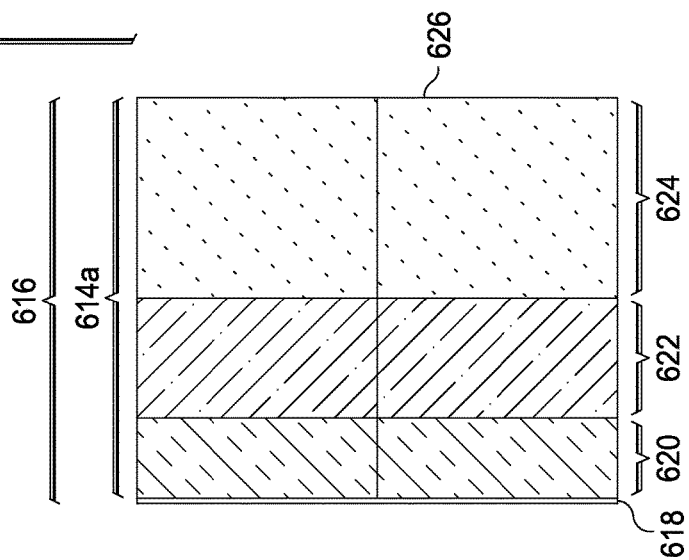

As shown in FIGS. 6B-6D, the crucible 602 also incorporates specially designed insulation packages 614a, 614b, and 614c. In FIG. 6B, the crucible 602 has walls 616 which are made from an outer panel 618 and the specially designed insulation package 614a. In this example, the specially designed insulation package 614a includes a microporus panel 620 (approximately 1" thick) located next to the outer panel 618, a ceramic fiber layer 622 (e.g., 1½" thick HP fiber frax 622) located next to the microporus panel 620, a fire brick 624 (approximately 2½" thick) located next the ceramic fiber layer 622. The fire brick 624 has an outer face 626 which is exposed to the heat.

In FIG. 6C, the crucible 602 has a ceiling 628 which is made from an outer panel 630 and the specially designed insulation package 614b. In this example, the specially designed insulation package 614b includes a microporus panel 632 (approximately 1" thick) located next to the outer panel 630, a ceramic fiber layer 634 (e.g., 1½" thick HP fiber frax 634) located next to the microporus panel 632, a fire brick 636 (approximately 2½" thick) located next the ceramic fiber layer 634. The fire brick 636 has an outer face 637 which is exposed to the heat.

In FIG. 6D, the crucible 602 has a floor 638 which is made from an outer panel 640 and the specially designed insulation package 614c. In this example, the specially designed insulation package 614c includes a microporus panel 642 (approximately 1½" thick) located next to the outer panel 640, a fire brick 644 (approximately 2½" thick) located next the microporus panel 642, a fiberglass silicate layer 646 (e.g., 1½" thick insblock 19 646) located next to the fire brick 644. The fiberglass silicate layer 646 has an outer face 648 which is exposed to the heat.

Although one embodiment of the present invention has been illustrated in the accompanying Drawings and described in the foregoing Detailed Description, it should be understood that the invention is not limited to the disclosed embodiment, but is capable of numerous rearrangements, modifications and substitutions without departing from the spirit of the invention as set forth and defined by the following claims.

The invention claimed is:
1. An electric glory hole comprising:
a body comprising a first opening and a second opening;
a core comprising a first opening and a second opening, wherein the first opening of the body is in communication with the first opening of the core, wherein the second opening of the body is in communication with the second opening of the core, and wherein the core is positioned inside the body;
a video camera positioned outside the body;
a lens holder, positioned outside the body, comprising a first side and a second side, wherein the first side of the lens holder is positioned next to the video camera, and wherein the second side of the lens holder is positioned next to at least the second opening in the body;
a camera casting, positioned inside the body, comprising a first opening and a second opening, wherein the first opening of the camera casting is in communication with the second opening of the body, and wherein the second opening of the camera casting is in communication with the second opening of the core;
the lens holder further comprises a heat block seal comprising a quartz lens, an air purge gap, and a glass filter lens, wherein the air purge gap is located between the quartz lens and the glass filter lens, wherein the quartz lens is positioned next to the video camera, and wherein the glass filter lens is positioned next to the second opening in the body.

2. The electric glory hole of claim 1, further comprising:
a first door comprising:
  a first hinged side, attached via a hinge to the body, comprising a first frame configured to receive and support two cast blocks configured to at least partially cover the first opening in the body; and
  a second hinged side, attached via a hinge to the body, comprising a second frame configured to receive and support two cast blocks configured to at least partially cover the first opening in the body.

3. The electric glory hole of claim 1, wherein the core comprises interconnected fire bricks and a series of refractory element baffles, wherein each refractory element baffle comprises a block with a passage through which an heating element is inserted and a cavity in which hangs the heating element, wherein the cavity is larger than the heating element, and wherein the cavity is sized to encompass at least three sides of the heating element.

4. The electric glory hole of claim 3, wherein the heating element is a molybdenum discilicide heating element.

5. An electric glory hole comprising:
a body comprising a first opening and a second opening;
a core comprising a first opening and a second opening, wherein the first opening of the body is in communication with the first opening of the core, wherein the second opening of the body is in communication with the second opening of the core, and wherein the core is positioned inside the body;
a video camera positioned outside the body;
a lens holder, positioned outside the body, comprising a first side and a second side, wherein the First side of the lens holder is positioned next to the video camera, and wherein the second side of the lens holder is positioned next to at least the second opening in the body;
a camera casting, positioned inside the body, comprising a first opening and a second opening, wherein the first opening of the camera casting is in communication with the second opening of the body, and wherein the second opening of the camera casting is in communication with the second opening of the core;
the lens holder further comprises a heat block seal comprising a quartz lens, an air purge gap, and a glass filter lens, wherein the air purge gap is located between the quartz lens and the glass filter lens, wherein the quartz lens is positioned next to the video camera, and wherein the glass filter lens is positioned next to the second opening in the body;
a first door comprising:
  a first hinged side, attached via a hinge to the body, comprising a first frame configured to receive and support at least one cast block, wherein the first frame further comprising at least one pin wherein (1) when the at least one pin is inserted into the at least one cast block then the at least one cast block is held to the first frame, and (2) when the at least one pin is removed from the at least one cast block then the at least one cast block is able to slide-out from the first frame; and
  a second hinged side, attached via a hinge to the body, comprising a second frame configured to receive and support at least one cast block, wherein the second frame further comprising at least one pin wherein (1) when the at least one pin is inserted into the at least one cast block then the at least one cast block is held to the second frame, and (2) when the at least one pin is removed from the at least one cast block then the at least one cast block is able to slide-out from the second frame.

6. An electric glory hole comprising:
a body comprising a first opening and a second opening;
a core comprising a first opening and a second opening, wherein the first opening of the body is in communication with the first opening of the core, wherein the second opening of the body is in communication with the second opening of the core, and wherein the core is positioned inside the body;
a video camera positioned outside the body;
a lens holder, positioned outside the body, comprising a first side and a second side, wherein the first side of the lens holder is positioned next to the video camera, and wherein the second side of the lens holder is positioned next to at least the second opening in the body;
a camera casting, positioned inside the body, comprising a first opening and a second opening, wherein the first opening of the camera casting is in communication with the second opening of the body, and wherein the second opening of the camera casting is in communication with the second opening of the core;
the lens holder further comprises a heat block seal comprising a quartz lens, an air purge gap, and a glass filter lens, wherein the air purge gap is located between the quartz lens and the glass filter lens, wherein the quartz lens is positioned next to the video camera, and wherein the glass filter lens is positioned next to the second opening in the body;
a first door comprising:
  a first hinged side, attached via a hinge to the body, comprising a first frame configured to receive and support at least one cast block configured to at least partially cover the first opening in the body, and
  a second hinged side, attached via a hinge to the body, comprising a second frame configured to receive and support at least one cast block configured to at least partially cover the first opening in the body;
a second door comprising:
  a first hinged side, attached via a hinge to the first hinged side of the first door, comprising a first frame configured to receive and support at least one cast block configured to at least partially cover the first opening in the body; and
  a second hinged side, attached via a hinge to the second hinged side of the first door, comprising a second frame configured to receive and support at least one cast block configured to at least partially cover the first opening in the body;
a third door comprising:
  a first hinged side, attached via a hinge to the first hinged side of the second door, comprising a first frame configured to receive and support at least one cast block configured to at least partially cover the first opening in the body; and
  a second hinged side, attached via a hinge to the second hinged side of the second door, comprising a second frame configured to receive and support at least one cast block configured to at least partially cover the first opening in the body.

7. An electric glory hole comprising:
a body comprising a first opening and a second opening;
a core comprising a first opening and a second opening, wherein the first opening of the body is in communication with the first opening of the core, wherein the second opening of the body is in communication with the second opening of the core, and wherein the core is positioned inside the body;
a video camera positioned outside the body;
a lens holder, positioned outside the body, comprising a first side and a second side, wherein the first side of the lens holder is positioned next to the video camera, and wherein the second side of the lens holder is positioned next to at least the second opening in the body;
a camera casting, positioned inside the body, comprising a first opening and a second opening, wherein the first opening of the camera casting is in communication with the second opening of the body, and wherein the second opening of the camera casting is in communication with the second opening of the core;
the lens holder further comprises a heat block seal comprising a quartz lens, an air purge gap, and a glass filter lens, wherein the air purge gap is located between the quartz lens and the glass filter lens, wherein the quartz lens is positioned next to the video camera, and wherein the glass filter lens is positioned next to the second opening in the body;
a first door comprising:
 a first hinged side, attached via a hinge to the body, comprising a first frame configured to receive and support two cast blocks configured to at least partially cover the first opening in the body, and
 a second hinged side, attached via a hinge to the body, comprising a second frame configured to receive and support two cast blocks configured to at least partially cover the first opening in the body;
a second door comprising:
 a first hinged side, attached via a hinge to the first hinged side of the first door, comprising a first frame configured to receive and support two cast blocks configured to at least partially cover the first opening in the body; and
 a second hinged side, attached via a hinge to the second hinged side of the first door, comprising a second frame configured to receive and support two cast blocks configured to at least partially cover the first opening in the body;
a third door comprising:
 a first hinged side, attached via a hinge to the first hinged side of the second door, comprising a first frame configured to receive and support two cast blocks configured to at least partially cover the first opening in the body; and
 a second hinged side, attached via a hinge to the second hinged side of the second door, comprising a second frame configured to receive and support two cast blocks configured to at least partially cover the first opening in the body.

8. An electric glory hole comprising:
a body comprising a first opening and a second opening;
a core comprising a first opening and a second opening, wherein the first opening of the body is in communication with the first opening of the core, wherein the second opening of the body is in communication with the second opening of the core, and wherein the core is positioned inside the body;
a video camera positioned outside the body;
a lens holder, positioned outside the body, comprising a first side and a second side, wherein the first side of the lens holder is positioned next to the video camera, and wherein the second side of the lens holder is positioned next to at least the second opening in the body;
a camera casting, positioned inside the body, comprising a first opening and a second opening wherein the first opening of the camera casting is in communication with the second opening of the body, and wherein the second opening of the camera casting is in communication with the second opening of the core;
the lens holder further comprises a heat block seal comprising a quartz lens, an air purge gap, and a glass filter lens, wherein the air purge gap is located between the quartz lens and the glass filter lens, wherein the quartz lens is positioned next to the video camera, and wherein the glass filter lens is positioned next to the second opening in the body;
a glory hole element block wall comprising a first outer panel and a first insulation package, wherein the first insulation package comprises a first microporus panel located next to the first outer panel, a first ceramic fiber layer located next to the first microporus panel, and a cement castable layer located next to the first ceramic fiber layer;
a glory hole wall comprising a second outer panel and a second insulation package, wherein the second insulation package comprises a second microporus panel located next to the second outer panel, a second ceramic fiber layer located next to the second microporus panel, and a first fire brick located next to the second ceramic fiber layer; and
a glory hole back wall comprising a third outer panel and a third insulation package, wherein the third insulation package comprises a third microporus panel located next to the third outer panel, a third ceramic fiber layer located next to the third microporus panel, and a second fire brick located next to the third ceramic fiber layer.

9. The electric glory hole of claim 8, wherein:
wherein the cement castable layer of the glory hole element block wall, the first fire brick of the glory hole wall, and the second fire brick of the glory hole back wall are components of the core; and
wherein the first outer panel of the glory hole element block wall, the second outer panel of the glory hole wall, and the third outer panel of the glory hole back wall are components of the body.

10. An electric glory hole comprising:
a body comprising a first opening and a second opening;
a core comprising a first opening and a second opening, wherein the first opening of the body is in communication with the first opening of the core, wherein the second opening of the body is in communication with the second opening of the core, and wherein the core is positioned inside the body;
a camera casting, positioned inside the body, comprising a relatively small opening and a relatively large opening, wherein the relatively small opening is in communication with the second opening in the body, wherein the relatively large opening is in communication with the second opening in the core, and wherein the relatively small opening is in communication with the relatively large opening; and
a video camera positioned outside the body and configured to visually inspect an interior of the core via the relatively small opening through the relatively large opening.

11. The electric glory hole of claim 10, further comprising:
a lens holder comprising a first side and a second side, wherein the first side of the lens holder is positioned next to the video camera, and wherein the second side of the lens holder is positioned next to the relatively small opening of the camera casting and the second opening in the body.

12. The electric glory hole of claim 11, wherein the lens holder further comprises a heat block seal comprising a quartz lens, an air purge gap, and a glass filter lens, wherein the air purge gap is located between the quartz lens and the glass filter lens, wherein the quartz lens is positioned next to the video camera, and wherein the glass filter lens is positioned next to the relatively small opening of the camera casting and the second opening in the body.

13. The electric glory hole of claim 10, wherein the camera casting is a cast refractory block with a tapered opening from the relatively small opening to the relatively large opening.

* * * * *

UNITED STATES PATENT AND TRADEMARK OFFICE
CERTIFICATE OF CORRECTION

PATENT NO. : 9,957,186 B2  
APPLICATION NO. : 14/509513  
DATED : May 1, 2018  
INVENTOR(S) : Steven Thomas Gibbs et al.

Page 1 of 1

It is certified that error appears in the above-identified patent and that said Letters Patent is hereby corrected as shown below:

On the Title Page

In Column 2, item (56), other publications, Line 2, delete "Eplore," and insert -- Xplore, --, therefor.

On page 2, Column 2, item (56), other publications, Line 9, delete "http://www.electroglass.com/specifications.html," and insert -- http://www.electroglass.com/MolyElements.html, --, therefor.

In the Claims

In Column 11, Line 21, Claim 4, delete "discilicide" and insert -- disilicide --, therefor.

In Column 14, Line 2, Claim 8, delete "opening" and insert -- opening, --, therefor.

In Column 14, Line 35, Claim 9, delete "wherein the" and insert -- the --, therefor.

Signed and Sealed this  
Tenth Day of December, 2019

Andrei Iancu  
*Director of the United States Patent and Trademark Office*